(12) United States Patent
Lee

(10) Patent No.: US 11,750,665 B2
(45) Date of Patent: Sep. 5, 2023

(54) DISTRIBUTED NETWORK SYSTEM FOR CALL PROCESSING PROVIDED ARE A CALL PROCESSING METHOD PERFORMED BY A DISTRIBUTED NETWORK SYSTEM AND A RECORDING MEDIUM, IN WHICH A PROGRAM FOR EXECUTING THE CALL PROCESSING METHOD IS RECORDED

(71) Applicant: ACROMATE CO., LTD., Seoul (KR)

(72) Inventor: Jong Um Lee, Seoul (KR)

(73) Assignee: ACROMATE CO., LTD., Seoul (KR)

( * ) Notice: Subject to any disclaimer, the term of this patent is extended or adjusted under 35 U.S.C. 154(b) by 0 days.

(21) Appl. No.: 17/608,295

(22) PCT Filed: Apr. 29, 2020

(86) PCT No.: PCT/KR2020/005713
§ 371 (c)(1),
(2) Date: Nov. 2, 2021

(87) PCT Pub. No.: WO2020/226350
PCT Pub. Date: Nov. 12, 2020

(65) Prior Publication Data
US 2022/0210204 A1    Jun. 30, 2022

(30) Foreign Application Priority Data

May 3, 2019   (KR) ........................ 10-2019-0052108

(51) Int. Cl.
| | | |
|---|---|---|
| *G06F 13/00* | (2006.01) | |
| *H04L 65/1046* | (2022.01) | |
| *H04L 65/1104* | (2022.01) | |
| *H04L 61/4557* | (2022.01) | |
| *H04L 9/40* | (2022.01) | |

(Continued)

(52) U.S. Cl.
CPC ...... *H04L 65/1046* (2013.01); *H04L 61/4557* (2022.05); *H04L 63/08* (2013.01);
(Continued)

(58) Field of Classification Search
CPC . H04L 65/1046; H04L 61/4557; H04L 63/08; H04L 65/1069; H04L 65/1073;
(Continued)

(56) References Cited

U.S. PATENT DOCUMENTS

| | | |
|---|---|---|
| 9,998,424 B1 | 6/2018 | Judge et al. |
| 2005/0278436 A1 | 12/2005 | Sharma et al. |

(Continued)

FOREIGN PATENT DOCUMENTS

| | | |
|---|---|---|
| CN | 105554327 A | 5/2016 |
| KR | 10-2007-0045545 A | 5/2007 |

(Continued)

OTHER PUBLICATIONS

International Search Report dated Jul. 30, 2020 in corresponding application No. PCT/KR2020/005713, 5 pgs.

(Continued)

*Primary Examiner* — Kenneth R Coulter
(74) *Attorney, Agent, or Firm* — Maier & Maier, PLLC

(57) ABSTRACT

A distributed network system for call processing, according to one embodiment, includes: a plurality of relay devices; and a call routing server for managing information about the plurality of relay devices and information about subscribers registered to the plurality of relay devices, where each of the plurality of relay devices can include: a database; a protocol relay unit; a call processing unit for checking whether the sender of a call and the receiver of the call are at least one subscriber, on the basis of an SIP signal incoming through the protocol relay unit; and a packet processing unit for realigning incoming phone call packets of the call according to the sequence of the phone call packets, and adjusting the transmission speed of the realigned phone call packets according to a situation in which the phone call packets are incoming.

19 Claims, 15 Drawing Sheets

(51) Int. Cl.
*H04L 65/1069* (2022.01)
*H04L 65/1073* (2022.01)
*H04L 65/80* (2022.01)
*H04L 69/16* (2022.01)

(52) U.S. Cl.
CPC ...... *H04L 65/1069* (2013.01); *H04L 65/1073* (2013.01); *H04L 65/1104* (2022.05); *H04L 65/80* (2013.01); *H04L 69/16* (2013.01)

(58) Field of Classification Search
CPC ..... H04L 65/1104; H04L 65/80; H04L 69/16; H04L 65/1056; H04L 61/4535; H04L 61/5076; H04L 61/4511
USPC ................................ 709/201, 230, 236, 228
See application file for complete search history.

(56) References Cited

U.S. PATENT DOCUMENTS

| | | | | |
|---|---|---|---|---|
| 2007/0263597 | A1* | 11/2007 | Morinaga | H04L 47/2416 370/351 |
| 2008/0171511 | A1* | 7/2008 | Sumita | H04B 7/2606 455/7 |
| 2008/0181375 | A1* | 7/2008 | Holder | H04L 65/1069 379/93.01 |
| 2015/0271212 | A1* | 9/2015 | Sawaki | H04L 65/1069 370/352 |
| 2016/0112462 | A1 | 4/2016 | Silver et al. | |
| 2022/0232052 | A1* | 7/2022 | Lee | H04L 65/1069 |

FOREIGN PATENT DOCUMENTS

| | | |
|---|---|---|
| KR | 10-2009-0102140 A | 9/2009 |
| KR | 10-2010-0051907 A | 5/2010 |
| KR | 10-2015-0039642 A | 4/2015 |
| KR | 10-2018-0105512 A | 9/2018 |

OTHER PUBLICATIONS

Extended European Search Report dated Nov. 15, 2022, in corresponding European Application No. 20802985.0, 10 pages.
Office Action dated Jan. 19, 2023, in corresponding Chinese Application No. 202080033472.0, 25 pages.

* cited by examiner

DISTRIBUTED NETWORK SYSTEM FOR CALL PROCESSING PROVIDED ARE A CALL PROCESSING METHOD PERFORMED BY A DISTRIBUTED NETWORK SYSTEM AND A RECORDING MEDIUM, IN WHICH A PROGRAM FOR EXECUTING THE CALL PROCESSING METHOD IS RECORDED

TECHNICAL FIELD

The present disclosure relates to a distributed network system and a call processing method performed by the distributed network system and, more particularly, to a technique for providing a service that stores and shares VoIP calls, SNS, text messages, and file data using a distributed network system including a plurality of relay devices.

BACKGROUND

Existing service providers have been controlling and managing VoIP, SNS, text message, and cloud services and performing subscriber registration and management of these services through a central server. In a service structure designed to utilize the central server, if the central server is hacked, impingement on personal privacy and human rights may occur due to large-scale personal information leakage. If the central server fails to operate appropriately, it becomes impossible to provide relevant services to a plurality of users. Further, since the performance of the central server affects service quality, data capacity and file format may be limited in the case of data sharing among subscribers. Moreover, since a user who wants to use a service has to log in to the central server, there is a risk that the user's personal information is leaked each time the user logs in to the server. In particular, in the centralized network structure, as terminals move away from each other, service quality deteriorates during the transmission and reception of media data (see, e.g., Korea Patent Application Publication No. 10-2018-0105512).

SUMMARY

The present disclosure provides a distributed network system including a plurality of relay devices and a call routing server with which a privately-owned platform may be easily constructed.

Further, the present disclosure provides a distributed network system capable of improving quality of media data communication through packet processing and a call processing method performed by the distributed network system.

Technical objects to be achieved by the present disclosure are not limited to those described above, and other technical objects not mentioned above may also be clearly understood from the descriptions given below by those skilled in the art to which the present disclosure belongs.

In accordance with an aspect of the present disclosure, there is provided a distributed network system for call processing, the distributed network system comprising: a plurality of relay devices that perform call processing; and a call routing server that manages information on the plurality of relay devices and information on subscribers registered in the plurality of relay devices. Each of the plurality of relay devices comprises: a database that stores information on at least one subscriber registered in the corresponding relay device; a protocol relay unit that processes an initial session initiation protocol (SIP) signal of the call; a call processing unit that checks whether a sender and a recipient of the call are the at least one subscriber based on the SIP signal received through the protocol relay unit and provides the received SIP signal to the call routing server when the sender of the call is the at least one subscriber and the recipient of the call is not the at least one subscriber; and a packet processing unit that rearranges incoming call packets of the call according to a sequence of the call packets and adjusts a transmission speed of the rearranged call packets according to a condition of the incoming call packets.

Further, when both of the sender and the recipient of the call are the at least one subscriber, the call processing unit may process the call through the protocol relay unit, and when the sender of the call is not the at least one subscriber and the recipient of the call is the at least one subscriber, the call processing unit may exchange information on the call with the sender of the call.

The distributed network system may further include a number authentication server that receives a service registration request of a user who wants to use a service for processing the call that is transmitted from a first relay device among the plurality of relay devices through the call routing server, provides a unique number assigned by a telecommunication company to the first relay device through the call routing server, and provides, when the number authentication server receives a call, which is transmitted via the unique number from the first relay device, from the telecommunication company, a message informing that the call number of the call transmitted via the unique number is an authentication number to the first relay device through the call routing server.

Further, the call routing server may store the authentication number as information on a subscriber to the first relay device, and the first relay device may store the authentication number as information on the at least one subscriber.

The distributed network system may further include an IP update server. Further, the call routing server, in response to a TCP channel connection request from a third relay device located in a private network among the plurality of relay devices, may provide, to the IP update server, information on at least one fourth relay device, which is located in a public network and is available as a gateway for the third relay device among the plurality of relay devices managed by the call routing server. The IP update server may cause a domain name server to replace an IP address of a domain to which the third relay device is connected with an IP address of the at least one fourth relay device and notify the call routing server that the replacement has been approved when the domain name server approves the replacement. The call routing server may provide information on the at least one fourth relay device to the third relay device to form a TCP channel between the third relay device and the fourth relay device.

Further, the at least one fourth relay device may relay received data to the third relay device through the TCP channel and provide data received through the TCP channel from the third relay device to a user.

Further, a packet processing unit of the fourth relay device may process call packets of a call in which the at least one subscriber registered in the third relay device is a sender or a recipient.

Further, each of the plurality of relay devices may further include a gateway that sends out the call to a telecommunication company server using a landline phone line if it is determined that the recipient of the call is not the at least one subscriber and it is determined through the call routing server that the recipient of the call is not a subscriber to a different relay device.

Further, the call processing unit may analyze a phone number of the recipient of the call and, when the phone number includes a separator, provide a remaining number after excluding an unique number of each of the plurality of relay device and the separator from the phone number to a gateway to thereby send out the call to a telecommunication company server using a landline phone line.

Further, the packet processing unit may transmit the rearranged call packets at a first time interval when the call packets are received sequentially, transmit the rearranged call packets at a second time interval shorter than the first time interval when the call packets are received at the same time, and, in the occurrence of a delay while the call packets are being received, rearrange packets of the call packets that are received after the delay and transmit the rearranged packets at a third time interval shorter than the first time interval.

Further, the call routing server may include a packet processing unit that rearranges incoming call packets of the call according to a sequence of the call packets and adjusts a transmission speed of the rearranged call packets according to a condition of the incoming call packets.

Further, in response to a request from a first relay device among the plurality of relay devices, when a recipient of a call received from the first relay device is the subscriber, the call routing server may transmit the call to a second relay device to which the recipient is registered among the plurality of relay devices.

In accordance with another aspect of the present disclosure, there is provided a call processing method performed by a distributed network system for call processing, the distributed network system including a plurality of relay devices performing call processing; and a call routing server managing information on the plurality of relay devices and information on subscribers registered in the plurality of relay devices, each of the plurality of relay devices including a database storing information on at least one subscriber registered in the corresponding relay device; a protocol relay unit processing an initial SIP signal of the call; a call processing unit processing the call based on the SIP signal received through the protocol relay unit; and a packet processing unit processing and transmitting received call packets of the call, the call processing method comprising: checking, by the call processing unit of a first relay device among the plurality of relay devices, whether a sender and a recipient of the call are the at least one subscriber based on the SIP signal received through the protocol relay unit of the first relay device; providing, by the call processing unit of the first relay device, the received SIP signal to the call routing server when the sender of the call is the at least one subscriber, and the recipient of the call is not the at least one subscriber; based on the SIP signal provided from the first relay device, when the recipient of the call belongs to the subscribers, transmitting, by the call routing server, the call to a second relay device to which the recipient is registered among the plurality of relay devices; and rearranging, by the packet processing unit of the first relay device, incoming call packets of the call according to a sequence of the call packets and adjusting a transmission speed of the rearranged call packets according to a condition of the incoming call packets.

Further, when the call processing unit of the first relay device determines that both of the sender and the recipient of the call are the at least one subscriber, the call processing unit of the first relay device may process the call through the protocol relay unit, and when the sender of the call is not the at least one subscriber and the recipient of the call is the at least one subscriber, information on the call may be exchanged with the sender of the call by the call processing unit of the first relay device.

Further, the distributed network system may further include a number authentication server, and the call processing method may further include receiving, by the number authentication server, a service registration request of a user who wants to use a service for processing the call that is transmitted from the first relay device through the call routing server; providing, by the number authentication server, a unique number assigned by a telecommunication company to the first relay device through the call routing server; and when the number authentication server receives a call, which is transmitted via the unique number from the first relay device, from the telecommunication company, providing, by the number authentication server, a message informing that the call number of the call transmitted via the unique number is an authentication number to the first relay device through the call routing server.

The call processing method may further include storing, by the call routing server, the authentication number as information on a subscriber to the first relay device, and storing, by the first relay device, the authentication number as information on the at least one subscriber.

Further, the distributed network system may further include an IP update server, and the call processing method may further include providing, by the call routing server in response to a TCP channel connection request from a third relay device located in a private network among the plurality of relay devices, the IP update server with information on at least one fourth relay device, which is located in a public network and is available as a gateway for the third relay device among the plurality of relay devices managed by the call routing server; causing, by the IP update server, a domain name server to replace an IP address of a domain to which the third relay device is connected with an IP address of the at least one fourth relay device and notifying the call routing server that the replacement has been approved when the domain name server approves the replacement; and providing, by the call routing server, information on the at least one fourth relay device to the third relay device to form a TCP channel between the third relay device and the fourth relay devices.

Further, the adjusting the transmission speed may include transmitting the rearranged call packets at a first time interval when the call packets are received sequentially, transmitting the rearranged call packets at a second time interval shorter than the first time interval when the call packets are received at the same time, and, in the occurrence of a delay while the call packets are being received, rearranging packets of the call packets that are received after the delay and transmitting the rearranged packets at a third time interval shorter than the first time interval.

In accordance with still another aspect of the present disclosure, there is provided a storage medium that stores a program executing a call processing method performed by a distributed network system for call processing, the distributed network system including: a plurality of relay devices performing call processing; and a call routing server managing information on the plurality of relay devices and information on subscribers registered in the plurality of relay devices, each of the plurality of relay devices including a database storing information on at least one subscriber registered in the corresponding relay device; a protocol relay unit processing an initial SIP signal of the call; a call processing unit processing the call based on the SIP signal received through the protocol relay unit; and a packet processing unit processing and transmitting received call packets of the call, the call processing method comprising: checking, by the call processing unit of a first relay device among the plurality of relay devices, whether a sender and a recipient of the call are the at least one subscriber based on the SIP signal received through the protocol relay unit of the first relay device; providing, by the call processing unit of the first relay device, the received SIP signal to the call routing server when the sender of the call is the at least one subscriber, and the recipient of the call is not the at least one subscriber; based on the SIP signal provided from the first relay device, when the recipient of the call belongs to the subscribers, transmitting, by the call routing server, the call to a second relay device to which the recipient is registered among the plurality of relay devices; and rearranging, by the packet processing unit of the first relay device, incoming call packets of the call according to a sequence of the call packets and adjusting a transmission speed of the rearranged call packets according to a condition of the incoming call packets.

According to one embodiment, it is possible to construct a privately-owned platform easily, thereby minimizing platform construction cost and network usage fee.

In addition, it is possible to reduce the possibility of personal information leakage in the centralized service by the service provider, and the user of a relay device may freely read and delete information.

In addition, the present disclosure may improve the overall call quality, including improving the audio quality of a call and mitigating disconnection of audio/video data, by rearranging call packets including received audio and video data and transmitting the rearranged call packets by adjusting the transmission speed thereof according to the traffic condition of incoming call packets.

In addition, the present disclosure may reduce the cost by improving the call quality while using existing communication lines.

In addition, the present disclosure may allow easy access even to a relay device located in a private network through a protocol relay function.

DETAILED DESCRIPTION OF THE EMBODIMENTS

The advantages and features of exemplary embodiments of the present disclosure and methods of accomplishing them will be clearly understood from the following description of the embodiments taken in conjunction with the accompanying drawings. However, the present disclosure is not limited to those embodiments and is implemented in various forms. It is noted that the embodiments are provided to make a full disclosure and also to allow those skilled in the art to know the full scope of the present disclosure. Therefore, the present disclosure is to be defined only by the scope of the appended claims.

In the following description, well-known functions and/or configurations will not be described in detail if they would unnecessarily obscure the features of the disclosure. Further, the terms to be described below are defined in consideration of their functions in the embodiments of the disclosure and vary depending on a user's or operator's intention or practice. Accordingly, the definition is made on a basis of the content throughout the present disclosure.

Figure 1:
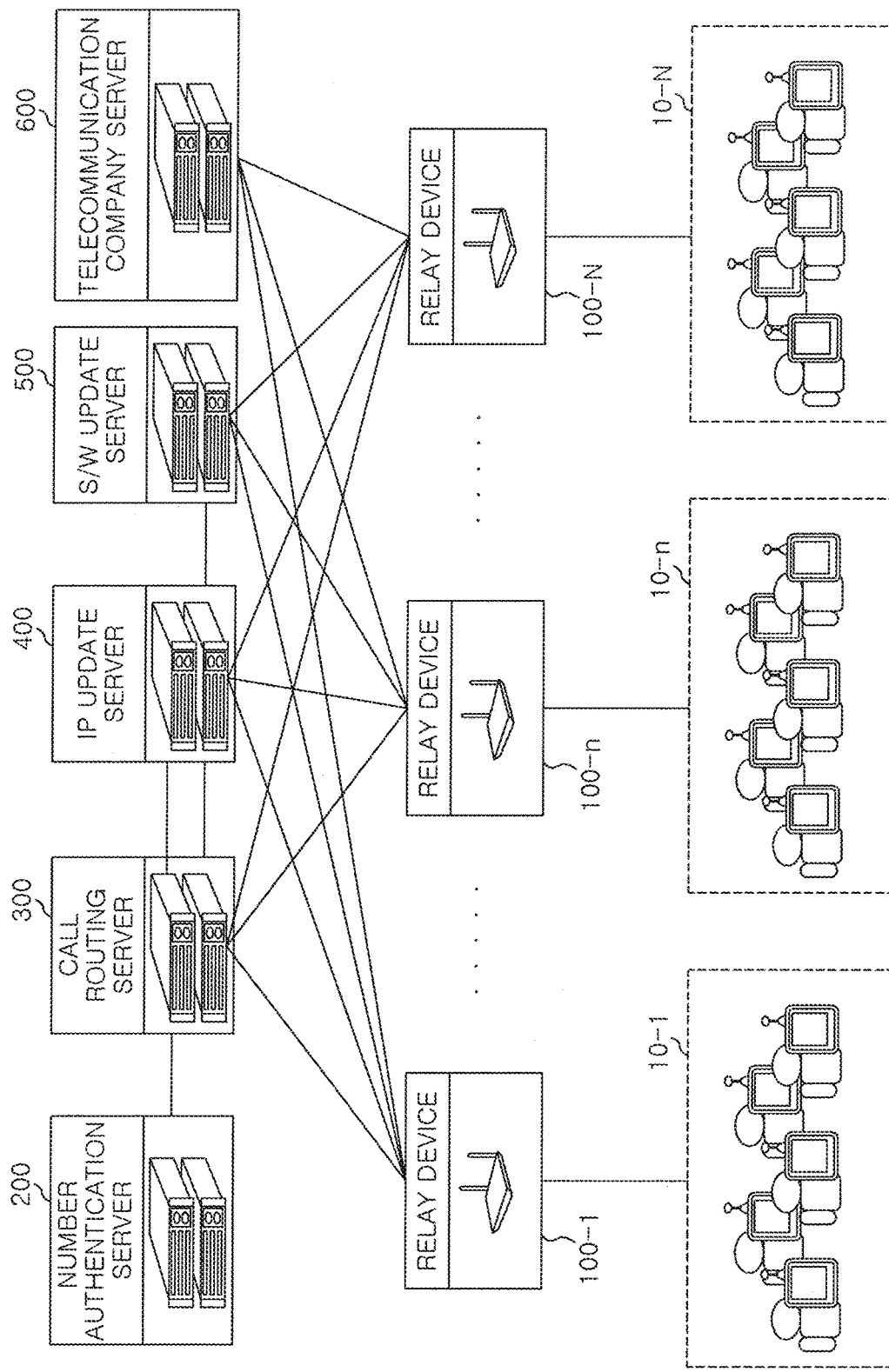
FIG. 1 illustrates the overall structure of a distributed network system including a plurality of relay devices according to an embodiment of the present disclosure.

FIG. 1 illustrates a distributed network environment including a plurality of relay devices according to an embodiment of the present disclosure and servers connecting the relay devices with each other.

A user may use a service provided by a relay device 100 according to one embodiment by registering phone numbers of the user's mobile terminal, wired phone, and IP phone in the relay device 100. As shown in FIG. 1, users may use various services (for example, an mVoIP service, a text messaging service, and a cloud service) through a distributed network including a plurality of relay devices 100-1 to 100-N by registering the phone numbers of their mobile terminals 10-1 to 10-N in the relay devices 100-1 to 100-N. In the case of FIG. 1, phone numbers of one or more mobile terminals 10-1 are registered in the relay device 100-1, phone numbers of one or more mobile terminals 10-n are registered in the relay device 100-n, phone numbers of one or more mobile terminals 10-N are registered in the relay device 100-N, and each mobile terminal is connected to the distributed network through the relay device in which the phone number of the corresponding mobile terminal is registered. Here, registering the phone number of the mobile terminal 10 in the relay device 100 is merely an example, and the user may also register a phone number of a wired phone in the relay device 100. Further, the user may install an application in the user's mobile terminal and subscribe to a service provided by the relay device 100 through the installed application, and the user may communicate with service subscribers for the mVoIP service, the text messaging service, and the cloud service.

The plurality of relay devices 100-1 to 100-N send and receive a call through a call routing server 300. Thus, a caller (sender) and a recipient at a distance far from each other are allowed to make a call by exchanging call packets through the plurality of relay devices. Although FIG. 1 shows the distributed network system including one call routing server 300 to simplify the embodiment, the scope of the present disclosure is not limited to the specific illustration. In other words, when the number of service subscribers increases, a plurality of call routing servers may be involved, and each call routing server may be allocated to a specific area and manage registration information of relay devices belonging to the area that the corresponding call routing server manages. In what follows, for the sake of the convenience of description, the embodiment including one call routing server 300 will be mainly described; however, the embodiment including a plurality of call routing servers will be described later with reference to FIG. 16.

A number authentication server 200 has a unique number assigned by a communication service provider (Telecommunication Company). When a user requests number authentication for service subscription from the relay device 100 through the application installed in the mobile terminal 10, the number authentication server 200 provides its unique number to the mobile terminal 10 through the call routing server 200 and the relay device 100. A detailed description of a service subscription procedure will be given later with reference to FIG. 2.

An IP update server 400 performs the function of replacing an IP address of a relay device in a private network with a public IP address so that the relay device located in the private network, such as a home network, that is not accessible from the outside may use a relay device having the public IP address for communication with the outside.

The relay devices 100-1 to 100-N in the distributed network update their S/W through an S/W update server 500. When the recipient of an incoming call is not registered as a subscriber to one of the relay devices, the relay devices provide the corresponding call to the call routing server 300.

When the call routing server 300 finds out that the recipient of the incoming call is not a subscriber of any of the relay devices 100-1 to 100-N in the distributed network, the call routing server 300 calls out to a telecommunication company server 600 to connect the incoming call through the telecommunication company.

Figure 2:
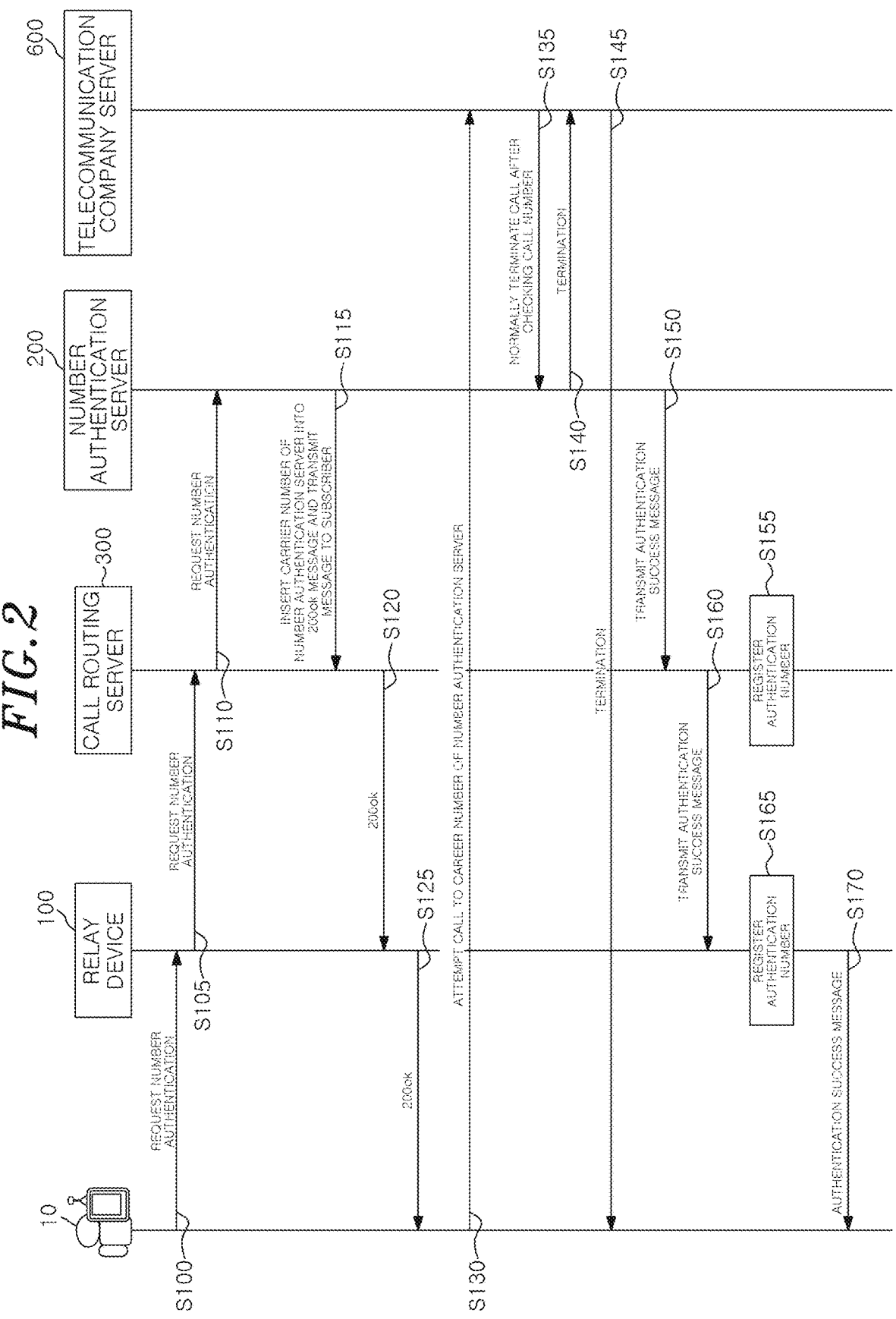
FIG. 2 is a flow diagram showing a procedure for subscribing a user to a service that the user wants to use through a relay device in the distributed network system according to the embodiment of the present disclosure.

With reference to FIG. 2, a procedure for a user to subscribe to a service provided by the relay device 100 in the distributed network system according to the embodiment of the present disclosure will be described.

A user who wants to use the distributed network including the plurality of relay devices 100 (100-1 to 100-N) requests number authentication from the number authentication server 200 to register a mobile phone number or a wired phone number, which the user intends to use for service, to the call routing server 300 through an application installed in the user's mobile terminal (steps S100 to S110). The number authentication server 200 inserts its carrier number into the message (200ok message) to check the validity of the phone number requested for authentication by the user wanting to subscribe to the service and sends the message to the user through the call routing server 300 and the relay devices 100 (steps S115 to S125). The user attempts to make the call to the carrier number of the number authentication server 200 in the message received from the number authentication server 200 using the user's mobile terminal (step S130). When the number authentication server 200 normally receives the call to its carrier number, the number authentication server 200 terminates the normal call (steps S135 and S140). After the normal call ends, the number authentication server 200 delivers an authentication success message including the authenticated phone number of the user to the call routing server 300 (step S150). After the call routing server 300 registers thereto the user's authenticated phone number (step S155), the call routing server 300 delivers the authentication success message to the relay device 100 (step S160). The relay device 100 registers the user's authenticated phone number and delivers the authentication success message to the user's mobile terminal 10 (step S170). The phone number for which subscriber registration is normally completed is linked to the call routing server 300 and, in this way, interoperation of the distributed network for communication with a service subscriber of a different relay device is completed.

When a user who owns the relay device 100 according to one embodiment makes a call to a subscriber belonging to the distributed network, the user uses an mVoIP service by processing a session initiation protocol (SIP) message through the call routing server 300 and processing audio and video data through a packet processing unit 180 of the relay device 100. Meanwhile, a call to a user who does not belong to the distributed network of the relay device may be handled through external call processing through the communication service provider (telecommunication company) according to the internal logic of the relay device 100.

Figure 3:
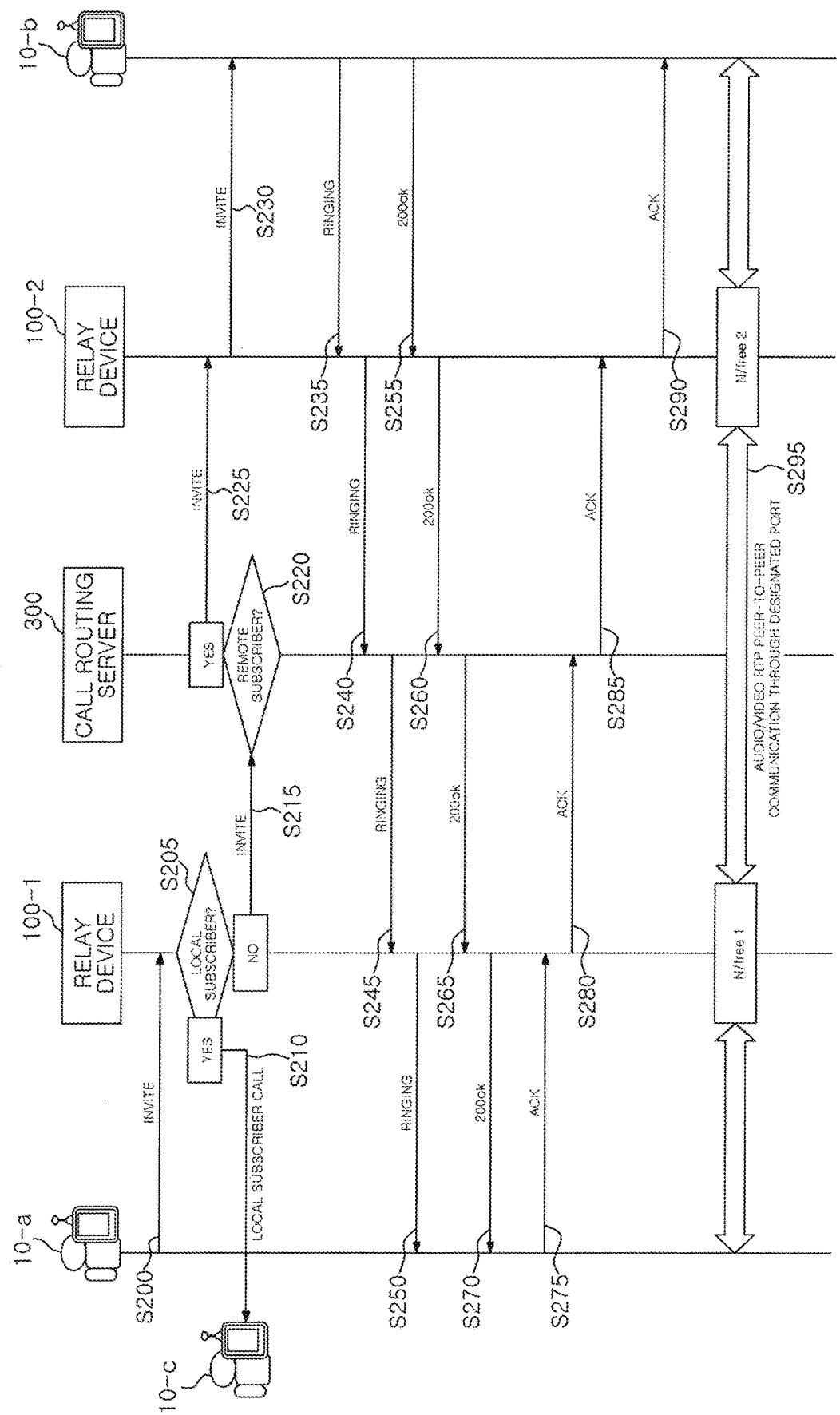
FIG. 3 is a flow diagram showing a process for making a call between service subscribers in the distributed network system according to the embodiment of the present disclosure.

With reference to FIG. 3, a process in which a call is made between subscribers belonging to the distributed network will be described.

The subscriber 10-a that is a user registered in the relay device 100-1, attempts a call (INVITE) to a recipient through an application installed in the mobile terminal (step S200). The relay device 100-1 checks whether the recipient is a local subscriber registered in the relay device 100-1 (step S205). When the recipient is the local subscriber (for example, when the recipient is a subscriber 10-c registered in the relay device 100-1) (YES in step S205 of FIG. 3), the relay device 100-1 processes a local subscriber call internally between the subscriber 10-*a* and the subscriber 10-*c* (step S210). However, when the recipient is not the local subscriber (NO in step S205), the relay device 100-1 attempts a call (INVITE) to the call routing server 300 (step S215).

After the call routing server 300 checks a list of subscribers registered in relay devices different from the relay device 100-1 (step S220), the call routing server 300 confirms that the subscriber 10-*b* is a remote subscriber registered in the relay device 100-2 (YES in step S220) and delivers the call attempt (INVITE) received from the relay device 100-1 to the relay device 100-2 (step S225). The relay device 100-2 delivers the call attempt (INVITE) to the subscriber 10-*b*, which is the call recipient (step S230).

When the subscriber 10-*a* and the subscriber 10-*b* exchange the session initiation protocol (SIP) signaling with each other (steps S235 to S290), audio/video real-time transport protocol (RTP) peer-to-peer communication proceeds according to the session description protocol (SDP) negotiation in a signaling message between the subscribers through a RTP relay port (indicated as "N/free 1" in FIG. 3) of a packet processing unit 180 of the relay device 100-1 and a RTP relay port (indicated as "N/free 2" in FIG. 3) of a packet processing unit 180 of the relay device 100-2 (step S295).

Figure 4:
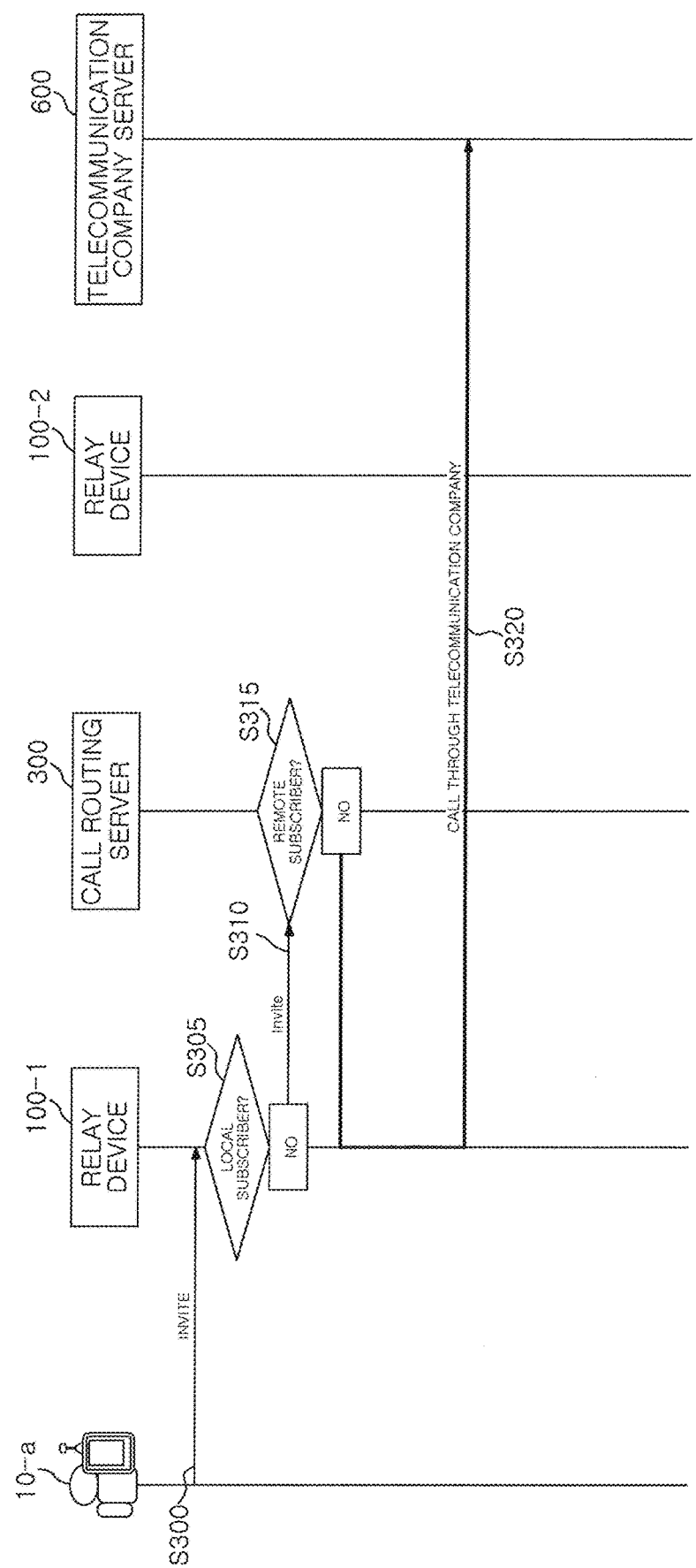
FIG. 4 is a flow diagram showing a process for making a call between a service subscriber and a non-subscriber of the service in the distributed network system according to the embodiment of the present disclosure.

FIG. 4 is a flow diagram showing a process for making a call between a subscriber belonging to the distributed network and a non-subscriber not belonging to the distributed network.

The subscriber 10-*a* that is a user registered in the relay device 100-1, attempts a call (INVITE) to a recipient through the application installed in the user's mobile terminal (step S300). The relay device 100-1 checks whether the recipient is the local subscriber registered to the relay device 100-1 (step S305). When the recipient is not the local subscriber (NO in step S305), the relay device 100-1 attempts a call (INVITE) to the call routing server 300 (step S310).

The call routing server 300 checks the list of subscribers (step S315). When the call routing server 300 is unable to find the recipient in the subscriber list (NO in step S315), the call routing server 300 informs the relay device 100-1 that the recipient is not on the subscriber list (step S320). When the relay device 100-1 has the unique number assigned by the telecommunication company, the relay device 100-1 calls the recipient through a server of the telecommunication company using the unique number without going through the subscriber 10-*a* (step S325). When the relay device 100-1 does not have the unique number assigned by the telecommunication company, the relay device 100-1 may inform the subscriber 10-*a* that the call recipient is not on the subscriber list, and the subscriber 10-*a* may attempt a call through the telecommunication company.

Meanwhile, the relay device 100 according to one embodiment may share the number assigned by the telecommunication company among a plurality of subscribers registered in the relay device 100 along with the number authenticated through the application installed in the mobile terminal of the subscriber 10. When making a call, the subscriber may selectively use one of the personal and shared numbers of the subscriber.

In an example of using a shared number, when the relay device 100 receives a shared number from the outside, the relay device 100 transmits an Invite message to all of the subscribers using the shared number. If one of the users using the shared number receives a call, the call attempt (INVITE) to the other users is automatically canceled.

Further, the relay device 100 may be used for business calls. The relay device 100 may be used for internal calls within a building by assigning n number of users random numbers.

Figure 5:
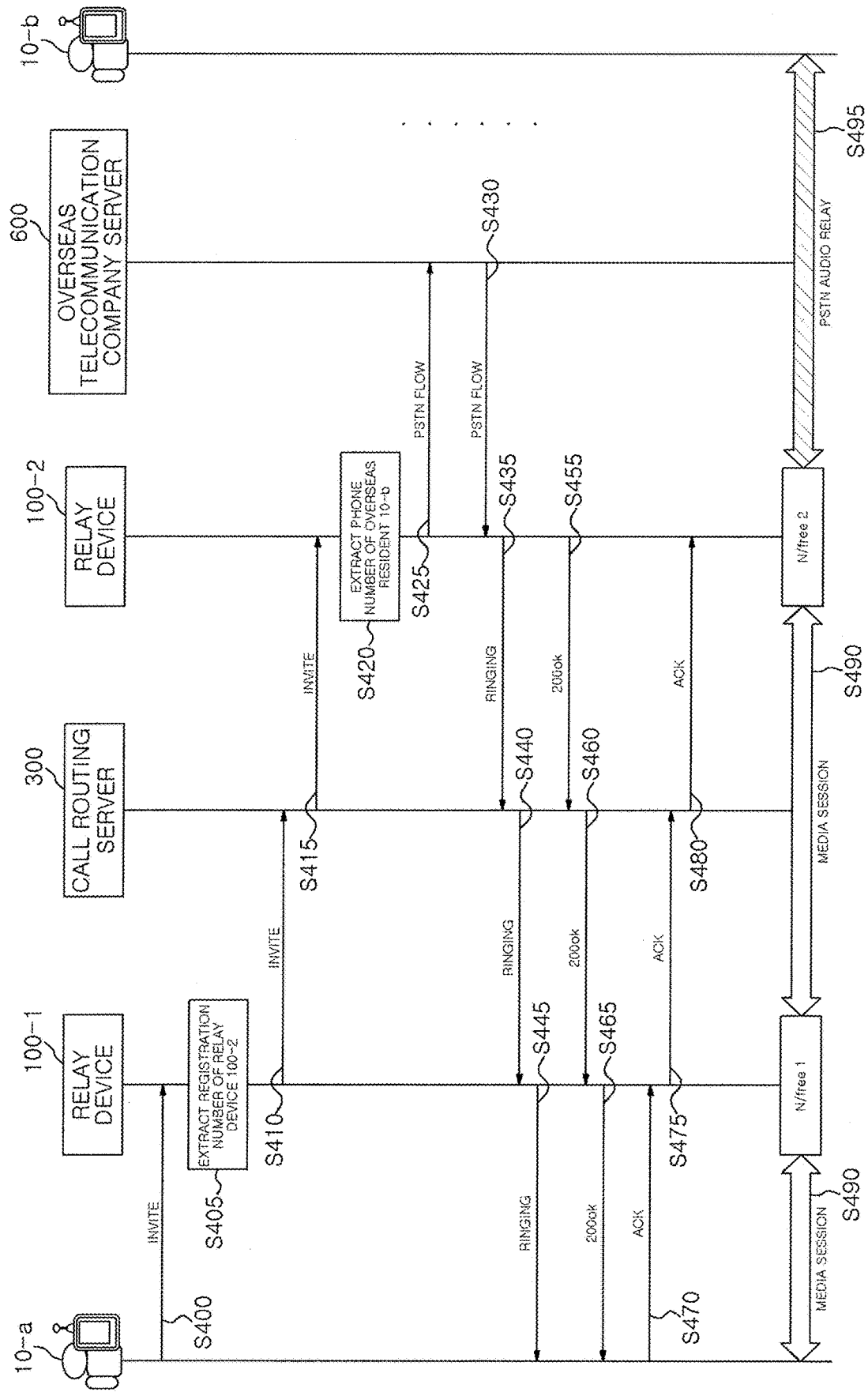
FIG. 5 is a flow diagram showing a process for making an international call between the service subscriber and the non-subscriber of the service in the distributed network system according to the embodiment of the present disclosure.

FIG. 5 is a flow diagram showing a process for making an international call between a service subscriber and a non-subscriber to the service in the distributed network system according to the embodiment of the present disclosure.

The relay device 100-2 in use abroad may be registered in the call routing server 300 using a number assigned by an overseas communication service provider (overseas telecommunication company). A subscriber of the relay device 100-1 in domestic use may attempt a call by attaching an overseas local number of the recipient to which the subscriber wants to make a call to a subscriber registration number of the relay device 100-2 in a foreign country. In this case, communication between the relay device 100-1 and the relay device 100-2 is made free of charge, and the call from the relay device 100-2 to the overseas local number of the recipient is charged based on the overseas local call rates through the landline PSTN flow of the relay device 100-2; therefore, international call charges may be saved. In the following, the process for making the international call between a domestic subscriber 10-*a* registered in the relay device 100-1 and an overseas resident 10-*b* not registered in the relay device will be described in detail with reference to FIG. 5.

The domestic subscriber 10-*a* may call the overseas resident 10-*b*, who is not a service subscriber, using the relay device 100-2 located abroad and belonging to a distributed network available for international calls. At this time, in order to make an international call between the subscriber 10-*a* and the overseas resident 10-*b*, a mutually agreed upon number system for international calls is required. One example of such a number system may combine the subscriber registration number of the relay device 100-2 located abroad and the phone number of the overseas resident 10-*b* using a predetermined separator. In this case, the relay device 100-1 and the relay device 100-2 may process the corresponding international call through a number interpretation function.

For example, suppose the registration number of the relay device 100-2 is "0254-27-0015" and the phone number of the overseas resident b 10-*b* is "080-1024-8820". The subscriber 10-*a* may attempt a call by entering the number to call in a format such as "0254270015*08010248820" through an application installed in the mobile terminal (step S400). Here, the subscriber registration number "0254270015" of the relay device 100-2 is inserted as a prefix to the phone number "08010248820" of the overseas resident 10-*b*, and '*' is used as a separator. However, the specific case is only an example, and various modifications are possible. The subscriber registration number "0254270015" of the relay device 100-2 may be attached in the form of a suffix of the phone number "08010248820" of the overseas resident 10-*b*, and any separator may be used as long as it distinguishes the registration number of the relay device from the phone number of the recipient.

The subscriber 10-*a* attempts a call (INVITE) including the international call number system to the relay device 100-1 (step S400). The relay device 100-1 interprets the above number system, recognizes the registration number "0254270015" of the relay device 100-2 (step S405) and transmits the corresponding call attempt (INVITE) to the call routing server 300 (step S410). The call routing server 300 retrieves the subscriber registration number "0254270015" of the relay device 100-2 from the list of registration numbers owned by the call routing server 300 and transmits a call attempt (INVITE) to the relay device 100-2 (step S415). The relay device 100-2 interprets the number system included in the call attempt, extracts the phone number "08010248820" of the overseas resident 10-*b*, and attempts a call to the overseas telecommunication company server 600 (step S425). Then, the overseas telecommunication company server sends a message for a call to the relay device 100-2 (step S430). Then, the relay device 100-2, the call routing server 300, and the relay device 100-1 exchange messages for the call through the telecommunication company between the subscriber 10-*a* and the overseas subscriber 10-*b* (steps S435 to S485). After that, the subscriber 10-*a* makes the international call to the non-subscriber that is the overseas resident 10-*b*, through a media session (step S490) between the mobile terminal and the relay device 100-1; a media session (step S490) between the N/free1 port of the relay device 100-1 and the N/free2 port of the relay device 100-2; and a PSTN audio relay (step S495) between the relay device 100-2 and the overseas resident 10-*b*. In this case, since overseas local call charges are made only on the calls through the PSTN audio relay (step S495), an advantage is obtained that international calls may be made at a low price. In addition, in order to reduce the international call charges as much as possible, the subscriber 10-*a* may make an international call by selecting a relay device closest to the recipient among overseas relay devices available and using the registration number of the selected relay device.

Figure 6:
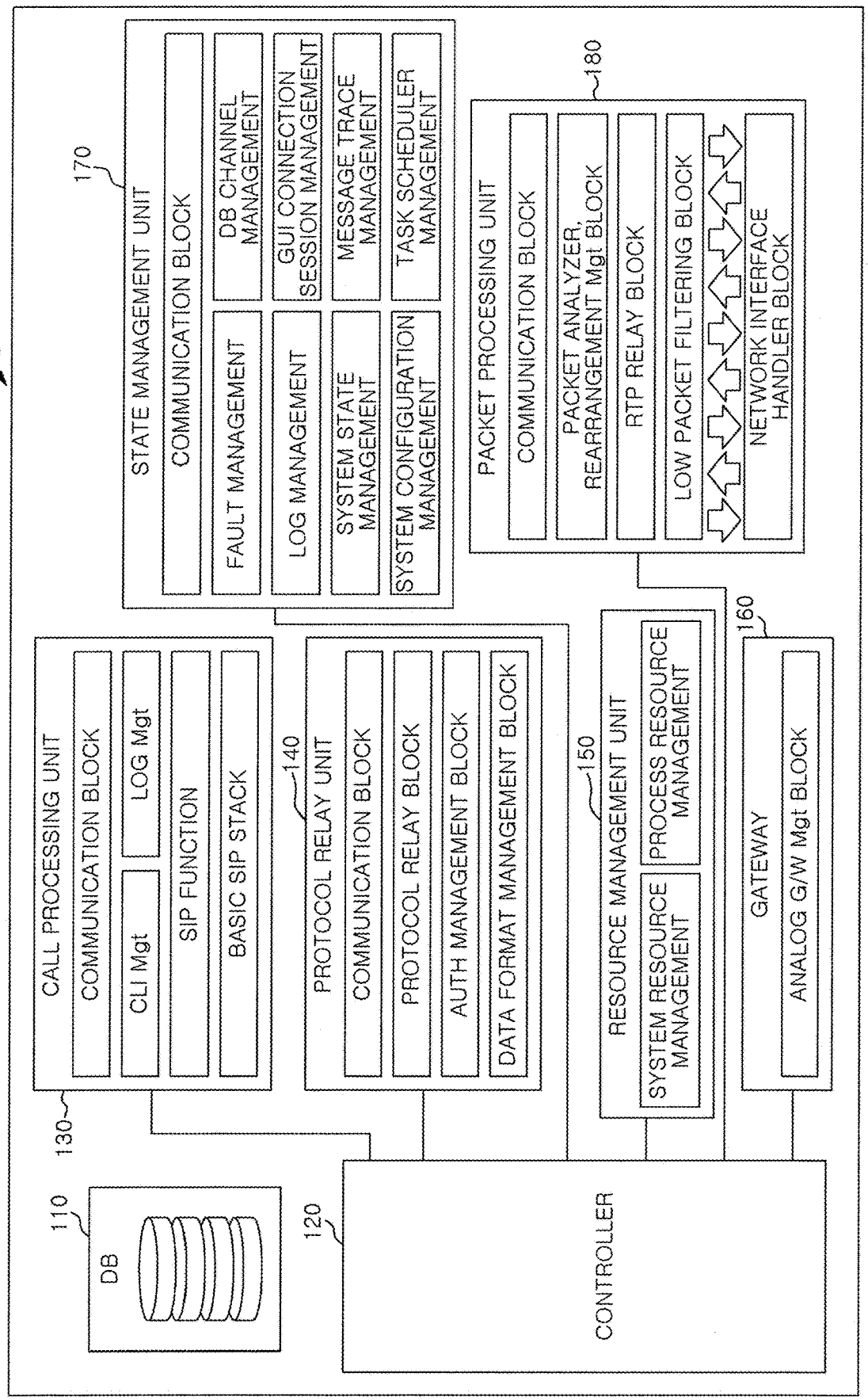
FIG. 6 is a functional block diagram of a relay device within the distributed network system according to the embodiment of the present disclosure.

FIG. 6 illustrates a functional block diagram of the relay device within the distributed network system according to the embodiment of the present disclosure.

The relay device 100 according to one embodiment comprises a database 110 that stores information on service subscribers, a protocol relay unit 140 that processes the initial SIP signal of a call, a call processing unit 130 that processes a call based on a SIP signal incoming through the protocol relay unit 140, and a packet processing unit 180 that rearranges and transmits call packets of the call. The relay device 100 may further comprise a resource management unit 150 that manages system resources and processes resources of the relay device, a gateway 160 that sends a call to the telecommunication company server using the landline phone line, and a state management unit 170 that manages information on the states of the protocol relay unit 140, the call processing unit 130 and the packet processing unit 180. The relay device 100 may separately include a controller 120 that manages all the units described above.

The protocol relay unit 140 controls call processing and text message processing protocols and controls a protocol for a web cloud service. The protocol relay unit 140 also serves as a control function for communication within a private network.

The call processing unit 130 performs a SIP-based call processing function by combining functional library blocks for performing individual functions on the SIP stack for basic SIP processing. The call processing unit 130 generates detailed information during the call processing and generates call processing log information (TRACE/DBG/WRN and so on). The call processing unit 130 outputs detailed data within the system on the system CLI. In addition, by managing service subscribers, the call processing unit 130 identifies local subscribers, interprets the number included in a call attempt, and interprets the number system including separators for international calls as described above.

The packet processing unit 180 exchanges IP/Port information of an RTP relay port for a call through communication in units of calls with the call processing unit 130 and performs a function of transmitting and receiving RTP/RTCP data to and from a destination address. In particular, in order to provide a stable audio/video call service, the packet processing unit 180 performs a packet rearrangement function and a jitter function capable of correcting the quality of call packets. To perform these functions, the packet processing unit 180 may monitor the network state, check network delay or congestion, and adjust a packet transmission speed according to the network state. In addition, the packet processing unit 180 may perform the function of dynamically adjusting the size of a jitter buffer to minimize disruption of audio/video and reduce a time delay for packet transmission and reception.

Since the existing (conventional) service providers manage the call processing and media relay services through the central server, the audio/video quality deteriorates in a final terminal depending on the network condition. To improve the quality degradation in an environment of the existing service providers, the audio/video correction is performed only in the jitter buffer of the final terminal. Different from the above, in a distributed network composed of a plurality of relay devices 100, since not only the caller (sender) terminal and the recipient terminal located at the ends of a communication process but also the packet processing unit 180 of the relay device 100 in which the caller and recipient terminals are registered and the packet processing unit of the call routing server 300 (the call routing server 300 may have a packet processing unit that performs the same function as the packet processing unit 180 of the relay device 100 according to the size of an area to which subscribers managed by the call routing server 300 belong, a network condition, or settings made by an operator) rearrange irregularly incoming RTP/RTCP packets according to a sequence and adjust the transmission speed of the rearranged packets through an active timer function according to the traffic condition of the incoming packets, the quality of an audio/video call may be even further improved. A detailed process for the packet processing unit 180 to arrange and transmit packets will be given later with reference to FIGS. 7 to 9.

The resource management unit 150 collects information on CPU, memory, and disk of the relay device 100 and information on CPU, memory, and disk for each process and provides the collected information to the controller 120.

The gateway 160 is an analog gateway that provides a call-out function that sends out a call to the outside by connecting the landline phone line thereto and a call-in function that receives an external call through the landline phone line.

The controller 120 manages the states of the entire processes within the relay device 100, provides the state data of the processes to the state management unit 170, and provides the system/process resource data collected by the resource management unit 150 to the state management unit 170.

Hereinafter, a packet rearrangement function and a jitter function of the packet processing unit 180 will be described in detail with reference to FIGS. 7 to 9. When SIP signaling is normally completed after a caller (sender) attempts a call, RTP transmission for audio/video media delivery starts, and the transmission is performed in units of packets. A reception module 182, a rearrangement module 184, and a stepping module 186 of FIGS. 7 to 9 are illustrated in a functionally simplified form of the configuration of the packet processing unit 180 that processes the audio/video RTP packets.

Figure 7:
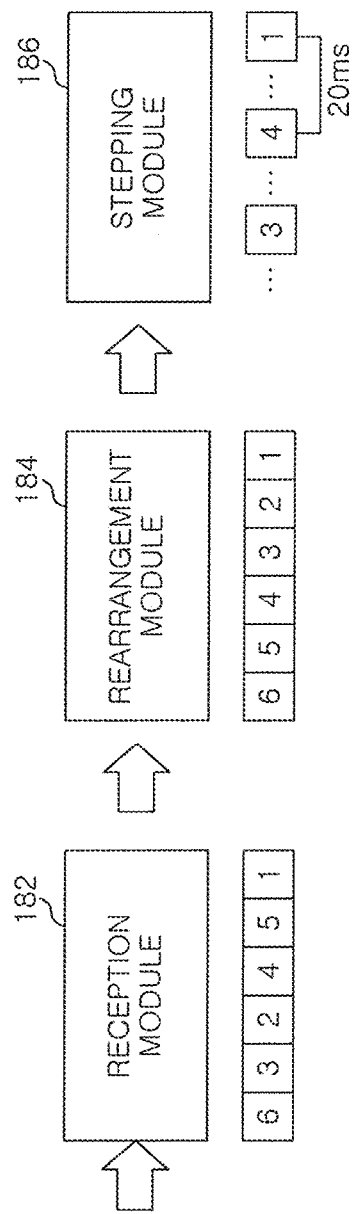
FIG. 7 shows an example in which a call packet is processed by a packet processing unit of the relay device shown in FIG. 6.

FIG. 7 illustrates packet rearrangement and transmission processes in a situation in which audio/video RTP packets are sequentially incoming into the relay device 100. As shown in FIG. 7, when packets are loaded into the reception module 182 in the order of packets 1, 5, 4, 2, 3, and 6, the rearrangement module 184 rearranges the packets in the order of 1, 2, 3, 4, 5, and 6 according to the sequence of the packets. The rearranged packets are transmitted sequentially through the stepping module 186 at a constant time interval (for example, 20 ms, a first time interval).

Figure 8:
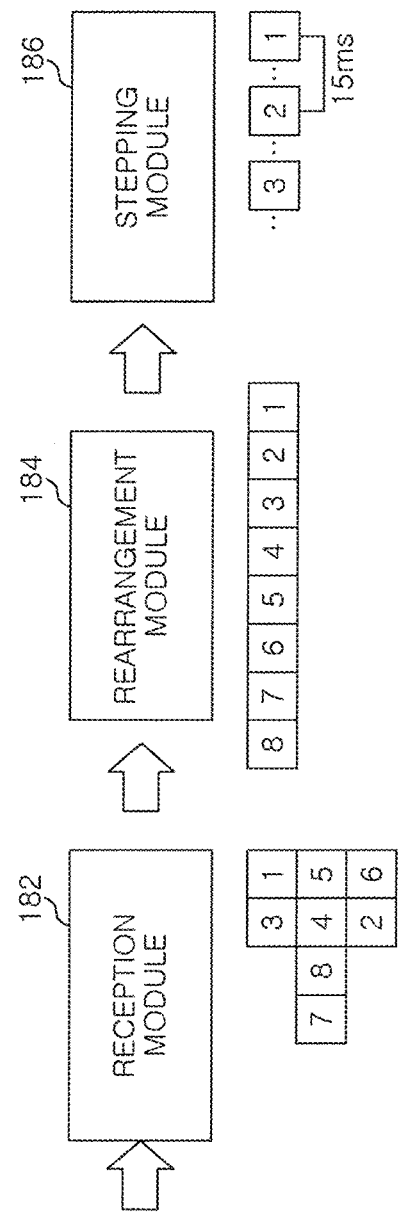
FIG. 8 shows another example in which a call packet is processed by the packet processing unit of the relay device shown in FIG. 6.

On the other hand, as shown in FIG. 8, when a plurality of audio/video RTP packets are simultaneously loaded into the reception module 182, the packets may be rearranged sequentially in the order of packets 1, 2, 3, 4, 5, and 6 according to the sequence of the packets, and the rearranged packets may be transmitted at time intervals (15 ms, a second time interval) shorter than the first time interval from the stepping module 186 in the order of packets 1, 2, 3, 4, 5, and 6.

Figure 9:
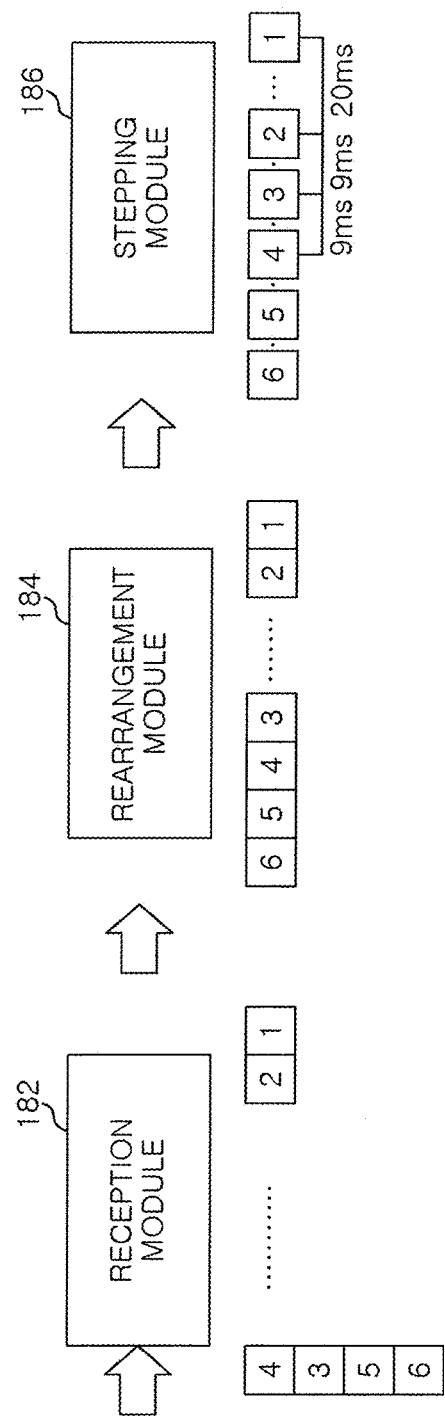
FIG. 9 shows still another example in which a call packet is processed by the packet processing unit of the relay device shown in FIG. 6.

Further, as shown in FIG. 9, when packets 1 and 2 are loaded at a regular transmission rate and packets 3, 4, 5, and 6 are loaded at the same time after a predetermined time delay, the rearrangement module 184 may rearrange the packets 1 to 6 according to the sequence of the packets, and the stepping module 186 may transmit the packets 1 and 2 at time intervals corresponding to a normal situation, namely the first time interval (20 ms) and transmit the packets 3 to 6 loaded after the time delay at a third time interval (for example, 9 ms) by adjusting the transmission interval to be shorter than the first time interval to compensate for the time delay. Here, the second time interval and the third time interval may be shorter than the first time interval, and the third time interval may be shorter than the second time interval.

When packets are processed as shown in FIGS. 7 to 9, packets may be transmitted seamlessly independently of a network environment. In the distributed network composed of the plurality of relay devices 100, packets go through the rearrangement and stepping processes described above whenever they pass through a hop (the relay device 100 and the call routing server 300). Therefore, the jitter function may be performed much more efficiently than in existing methods that perform the jitter function only in the final terminal. Moreover, better audio/video quality may be guaranteed compared to a service provided by existing big service providers.

Figure 10:
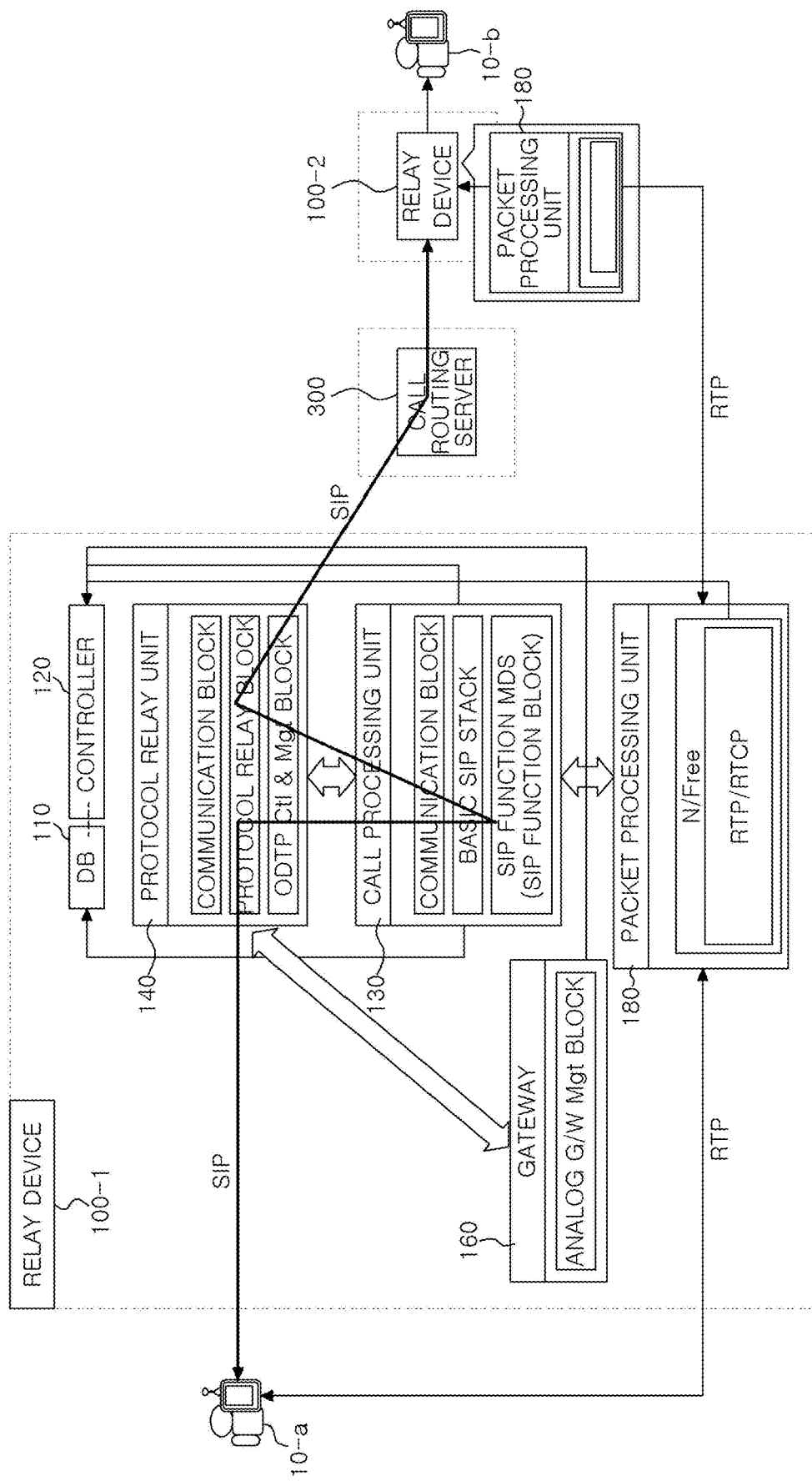
FIG. 10 illustrates a call processing process performed by a relay device within the distributed network system according to the embodiment of the present disclosure.

FIG. 10 illustrates a call processing process performed by the relay device within the distributed network system according to the embodiment of the present disclosure.

When the subscriber 10-*a* of the relay device 100-1 attempts a call to the number of the subscriber 10-*b*, the protocol relay unit 140 of the relay device 100-1 processes the initial SIP signal. After that, the call processing unit 130 of the relay device 100-1 determines whether the call recipient is a local subscriber stored in the database 110 of the relay device 100-1 based on the SIP signal received through the protocol relay unit 140. The call processing unit 130 internally processes the call through the protocol relay unit 140 when it is determined that the recipient is the local subscriber. When it is determined that the recipient is not the local subscriber, the call processing unit 130 delivers the SIP signal to the call routing server 300 through the protocol relay unit 140 and checks whether the recipient is a subscriber of another relay device 100-2. When it is determined that the recipient is a remote subscriber, the call processing unit 130 of the relay device 100-1 and the call processing unit 130 of the relay device 100-2 perform SIP message exchange negotiation through the call routing server 300 and exchange codec information for calls and port information to be used for audio/video RTP relay. When the SIP message negotiation is normally completed, media relay for an audio/video call is performed through a mutually agreed RTP relay port.

On the other hand, when the relay device 100-1 receives an incoming call from the subscriber 10-*b* through the call routing server 300, the protocol relay unit 140 of the relay device 100-1 processes the initial SIP signal and delivers the SIP signal to the call processing unit 130. When the SIP signal indicates that the call recipient is the local subscriber registered in the relay device 100-1, the call processing unit 130 internally processes the call through the protocol relay unit 140 as shown in FIG. 10.

Figure 11:
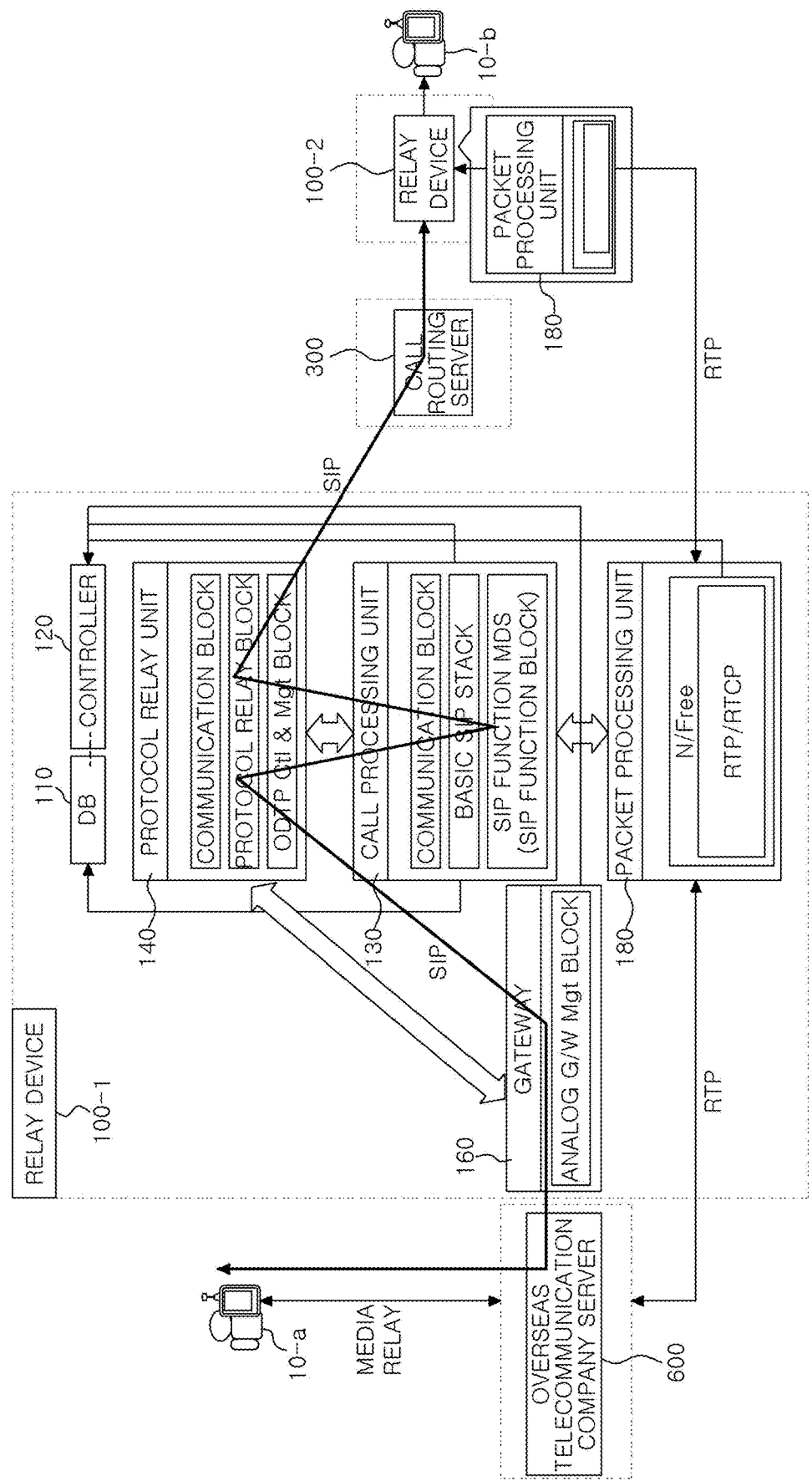
FIG. 11 illustrates a process in which a call is made by a relay device within the distributed network system according to the embodiment of the present disclosure between a domestic service subscriber and a non-subscriber that is an overseas resident.

FIG. 11 illustrates a process in which a call is made by the relay device within the distributed network system according to the embodiment of the present disclosure between a domestic service subscriber and a non-subscriber that is an overseas resident.

The subscriber 10-*b* of the relay device 100-2 attempts a call after combining a subscriber registration number of the relay device 100-1 with a predetermined separator and an overseas local phone number of the non-subscriber 10-*a* to the service that is an overseas resident. When the relay device 100-1 receives a SIP signal from the call routing server 300, the relay device 100-1 processes the initial SIP signal in the protocol relay unit 140 and delivers the processed SIP signal to the call processing unit 130. Then, the call processing unit 130 interprets the number system and transmits a call to the overseas local phone number through the gateway 160. When the call is connected, a media call path is established through the overseas telecommunication company server 600, and the call is normally made between the non-subscriber 10-*a* to the service and the subscriber 10-*b*.

Meanwhile, in the distributed network system according to the embodiment of the present disclosure, a user unable to directly access a relay device located in a private network may use a protocol (media and signaling) relay function of a relay device located in a public network to communicate with the outside. In the distributed network system according to the embodiment of the present disclosure, the call routing server 300 may manage information on a relay device capable of providing a spare resource for the protocol relay function among relay devices located in the public network.

A relay device 100-3 located in a private network such as a home network may form a TCP channel with at least one relay device 100-4 by receiving, from the call routing server 300, information on the at least one relay device 100-4 located in the public network that may be used for protocol relay to facilitate access to the relay device 100-3 from the outside. The relay device 100-3 located in the private network may communicate with the outside by performing the protocol relay through the TCP channel constructed between the at least one relay device 100-4 located in the public network and the relay device 100-3.

Hereinafter, a mechanism through which a user of the relay device 100-3 located in the private network registers himself to a service using the at least one relay device 100-4 located in the public network and communicates with a subscriber registered in another relay device 100-5 will be described with reference to FIGS. 12 to 15.

Figure 12:
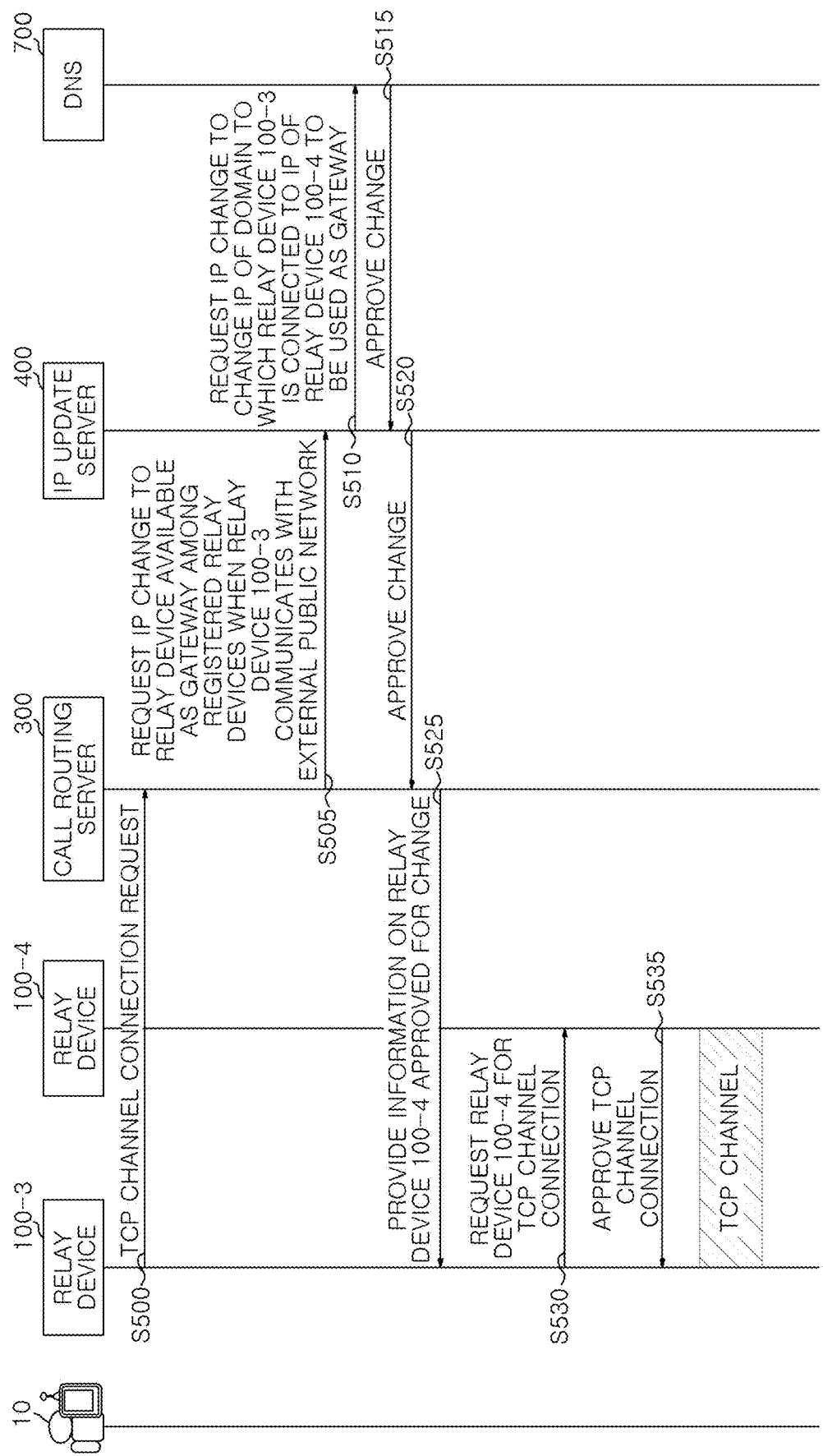
FIG. 12 is a flow diagram showing a process in which a relay device located in a private network forms a TCP channel with a relay device used as a gateway for communication with the outside in the distributed network system according to the embodiment of the present disclosure.

FIG. 12 is a flow diagram showing a process in which the relay device 100-3 located in the private network forms a TCP channel with the at least one relay device 100-4 to be used for protocol relay in the distributed network system according to the embodiment of the present disclosure.

When the relay device 100-3 located in the private network makes a TCP channel connection request to the call routing server 300 (step S500), the call routing server 300 provides the IP update server 40 with information on the at least one relay device 100-4 capable of providing a spare resource for protocol relay among relay devices registered in the call routing server 300 (step S505). At this time, the relay device 100-3 may request information on one or more relay devices capable of requesting a TCP channel connection from the call routing server 300, and the call routing server 300 may provide the IP update server 400 with information on available relay devices among the information on the relay devices 100-4 belonging to the call routing server 300.

The IP update server 400, while providing the domain name server (DNS) 700 with the information on the at least one relay device 100-4 received from the call routing server 300, requests the DNS 700 to change the IP of the domain to which the relay device 100-3 is connected to the IP of the at least one relay device 100-4 (step S510). After the DNS 700 changes the IP of the domain to which the relay device 100-3 is connected to the IP of the at least one relay device 100-4, the DNS 700 informs the IP update server 400 that the change has been approved (step S515). Then, the IP update server 400 informs the call routing server 300 of the approval of the change (step S520).

When the call routing server 300 provides information on the at least one relay device 100-4 approved for change to the relay device 100-3 (step S525), the relay device 100-3 makes a TCP channel connection request to the at least one relay device 100-4 (step S530), and when the at least one relay device 100-4 approves the TCP channel connection (step S535), a TCP channel is formed between the relay device 100-3 and the at least one relay device 100-4.

Figure 13:
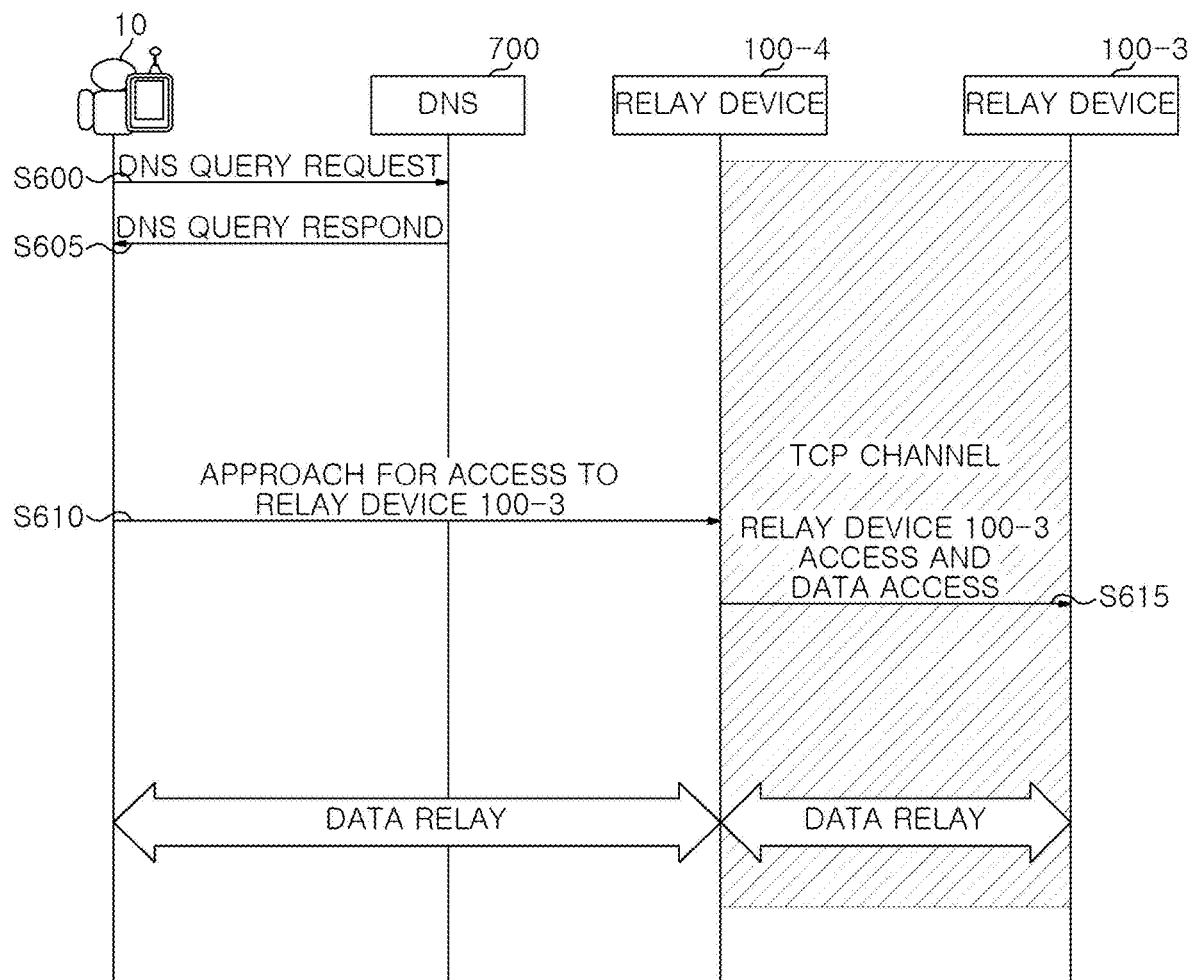
FIG. 13 is a flow diagram showing a process for accessing data within the relay device located in the private network from the outside through a TCP channel formed as shown in FIG. 12.

FIG. 13 is a flow diagram showing a process for accessing data within the relay device located in the private network from the outside through the TCP channel formed as shown in FIG. 12.

When a user 10, who is unable to directly access the relay device 100-3 located in the private network, tries to access the relay device 100-3 to use a cloud service, the user 10 is connected to the relay device 100-4 through a DNS query. Accessing the relay device 100-4 leads to the relay device 100-3 through the TCP channel already created between the relay device 100-3 and the relay device 100-4 (step S615). The user 10 may use the cloud service of the relay device 100-3 located in the private network through data relay with the relay device 100-4 and data relay through the TCP channel formed between the relay device 100-4 and the relay device 100-3.

Figure 14:
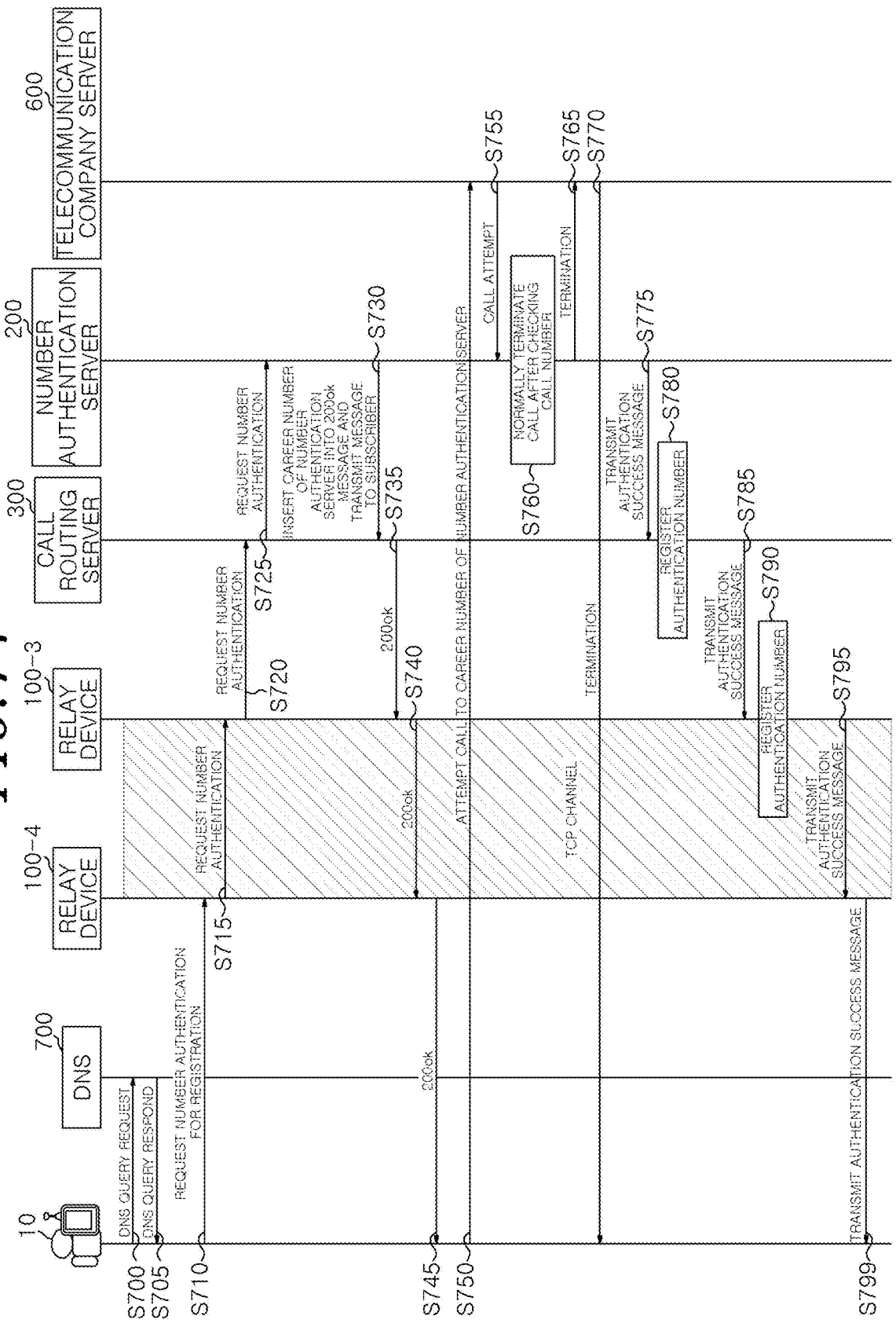
FIG. 14 is a flow diagram showing a procedure for registering a subscriber of a service of the distributed network system to the relay device located in the private network.

FIG. 14 is a flow diagram showing a procedure for registering a subscriber of a service of the distributed network system to the relay device located in the private network.

A user 10 who wants to use the service of the distributed network system through the relay device 100-3 located in the private network queries the DNS 700 to make a number authentication request for subscriber registration through the relay device 100-4 located in a public network, the relay device 100-4 being used as a gateway for protocol relay of the relay device 100-3 (step S710). When the relay device 100-4 receives the number authentication request from the user 10, the relay device 100-4 relays the received request to the relay device 100-3 through the TCP channel (step S715), and the relay device 100-3 requests the number authentication server 200 to perform number authentication through the call routing server 300 (steps S720 and S725). The process in which the user 10 makes a number authentication request to the number authentication server 200 through an application installed in the user's mobile terminal is basically the same as the number authentication process shown in FIG. 2. However, since the relay device 100-3 through which the user 10 attempts to use the service of the distributed network system is located in the private network, the only difference is that the user 10 accesses the relay device 100-3 through the relay device 100-4 located in the public network.

The process in which the number authentication server 200 provides the carrier number to the user is also substantially the same as the corresponding process shown in FIG. 2. However, the two processes differ only in that a message transmitted to the relay device 100-3 is relayed to the relay device 100-4 through the TCP channel. In other words, the number authentication server 200 inserts the carrier number of the number authentication server 200 into the message (200ok message) to check whether the phone number for which the user 10, who wants service registration, attempts an authentication request is a valid number and delivers the message to the user 10 through the call routing server 300, the relay device 100-3, and the relay device 100-4 (steps S730 to S745).

The user 10 attempts a call to the carrier number of the number authentication server 200 in the message received from the number authentication server 200 using the user's mobile terminal (step S750). When the number authentication server 200 receives an outgoing call to its carrier number (step S755), the number authentication server 200 confirms that the call number of the outgoing call is the user's number to be authenticated and terminates the call normally (steps S760, S765 and S770).

After normal termination of the call, the number authentication server 200 delivers an authentication success message including the authenticated phone number of the user to the call routing server 300 (step S775).

After the call routing server 300 registers thereto the authenticated phone number of the user (step S780), the call routing server 300 transmits the authentication success message to the relay device 100-3 (step S785). The relay device 100-3 registers thereto the authenticated phone number of the user (step S790) and relays the authentication success message to relay device 100-4 through the TCP channel (step S795); and the relay device 100-4 transmits the authentication success message to the user 10 (step S799).

Figure 15:
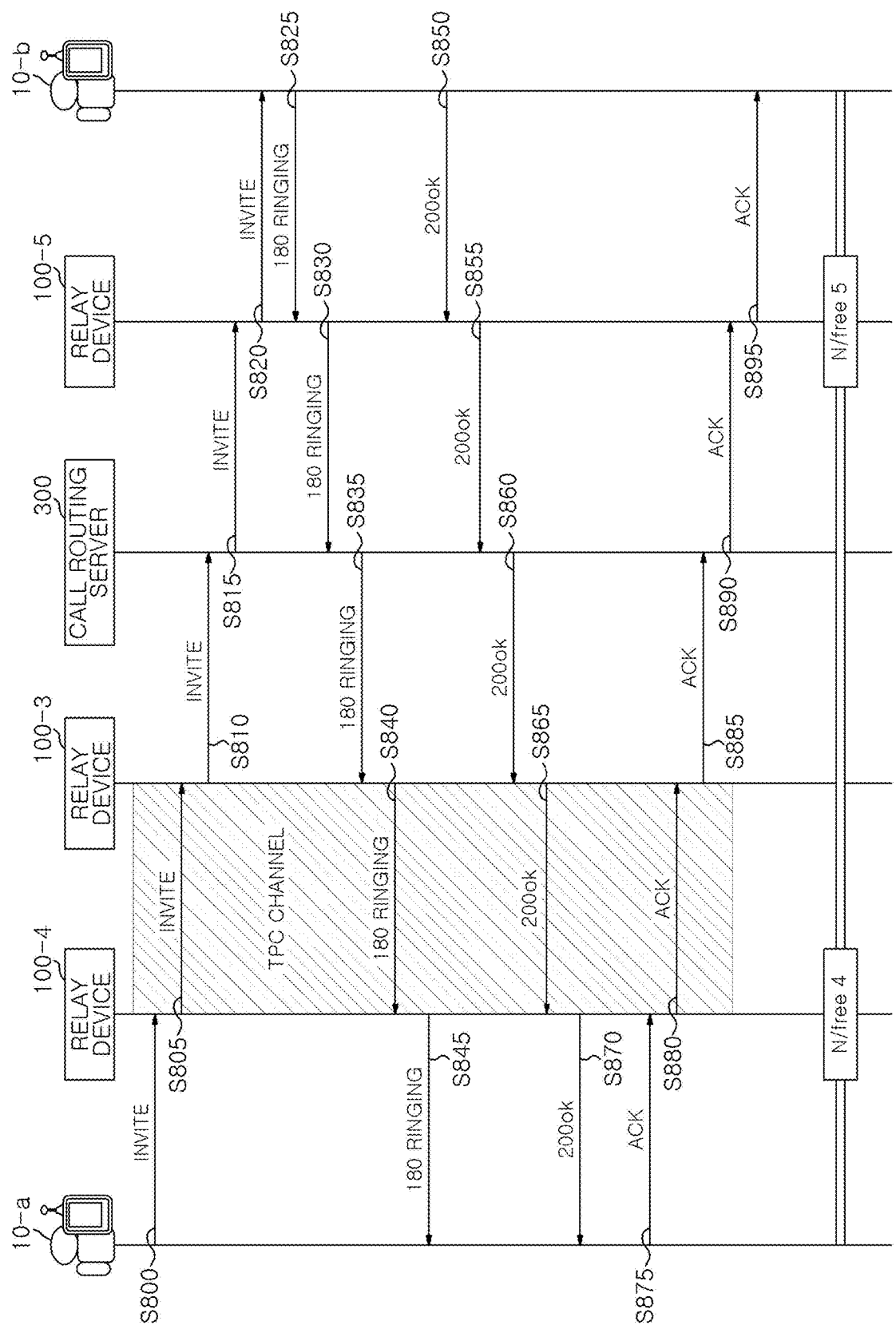
FIG. 15 is a flow diagram showing a process in which a call is made between a subscriber registered for the relay device located in the private network and a subscriber registered for a relay device located in a public network in the distributed network system according to the embodiment of the present disclosure.

FIG. 15 is a flow diagram showing a process in which a call is made between a subscriber registered for the relay device located in the private network and a subscriber registered for the relay device located in the public network in the distributed network system according to the embodiment of the present disclosure.

The process for making a call between the subscriber 10-*a* registered for the relay device 100-3 located in the private network and the subscriber 10-*b* registered for the relay device 100-5 located in the public network is basically the same as the process shown in FIG. 3. However, a difference between the two processes is that, rather than the packet processing unit 180 of the relay device 100-3, a call is made through the RTP relay port of the packet processing unit 180 of the relay device 100-4 located in the public network and used as a gateway of the relay device 100-3.

The user 10-*a* registered in the relay device 100-3 located in the private network attempts a call (INVITE) to a recipient through an application installed in the user's mobile terminal (step S800). The call attempt is delivered to the relay device 100-4 located in the public network and used as a gateway of the relay device 100-3 (step S800), and the relay device 100-4 relays the call attempt to the relay device 100-3 through a TCP channel (step S805). The relay device 100-3 transmits the call attempt to the call routing server 300 (step S810), and the call routing server 300 checks the information on the relay devices and subscribers managed by the call routing server 300 and delivers the call attempt to the relay device 100-5 in which the subscriber 10-b is registered. The relay device 100-5 delivers the call attempt to the mobile terminal of the subscriber 10-b that is the recipient of the call (step S820).

When the SIP signaling is performed between the subscriber 10-a and the subscriber 10-b (steps S825 to S895), the audio/video RTP peer-to-peer communication proceeds according to SDP negotiation in the signaling message between subscribers through a RTP relay port (indicated as "N/free4" in FIG. 15) of a packet processing unit 180 of the relay device 100-4 and a RTP relay port (indicated as "N/free5" in FIG. 14) of a packet processing unit 180 of the relay device 100-5.

Figure 16:
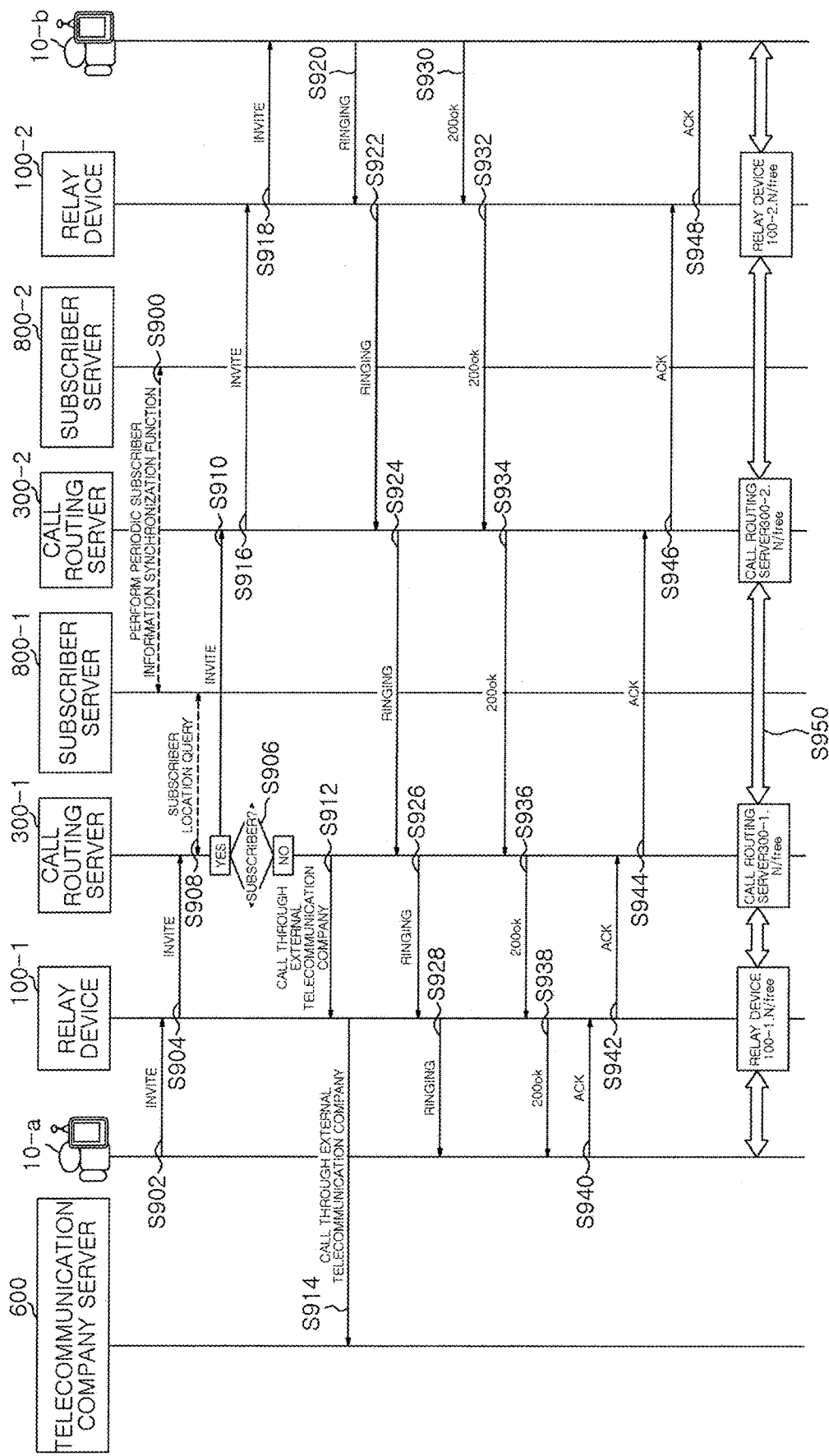
FIG. 16 illustrates an extended example of the distributed network system according to the embodiment of the present disclosure.

FIG. 16 illustrates an extended example of the distributed network system according to the embodiment of the present disclosure.

When relay devices belonging to the distributed network system are distributed over a wide area, a plurality of call routing servers 300-1 and 300-2 may be allocated so that each server separately manages relay devices located in a predetermined area. In this case, pieces of subscriber information of the distributed network system are managed by the call routing servers 300-1 and 300-2 and separate servers, for example, subscriber servers 800-1 and 800-2 and, between the subscriber servers 800-1 and 800-2, pieces of subscriber information managed by the respective subscriber servers 800-1 and 800-2 are periodically synchronized, so that pieces of subscriber information registered in the relay devices distributed over the wide area can be shared (step S900).

The process of making a call between the subscriber 10-a and the subscriber 10-b in the extended distributed network system shown in FIG. 16 is basically the same as the process shown in FIG. 3. However, since the call routing server 300-1 manages the relay device 100-1 in which the caller 10-a is registered, and the call routing server 300-2 manages the relay device 100-2 in which the call recipient 10-b is registered, a difference between the two processes in that the call attempt, SIP signaling, and audio/video RTP relay are all performed through the call routing server 300-1 and the call routing server 300-2. In addition, when a separate subscriber server, instead of the call routing server 300, manages subscriber information, the call routing server 300-1 determines which relay device the call recipient 10-b is registered to by querying the subscriber server 800-1. Further, when the relay device 100-1 and the relay device 100-2 are located very far from each other, when they are located in an unstable network area, or according to the operator's policy, the call routing server 300-1 and the call routing server 300-2 each may use the packet processing unit 180 to make call packets go through not only the packet processing unit of the relay devices but also the packet processing unit of the call routing servers, thereby preventing the quality of a long distance call from being degraded.

Meanwhile, the embodiments of the present disclosure may be implemented as a form of a computer-readable storage medium storing a computer program (computer-executable instructions) programmed to perform the respective steps or as a form of a computer program that is programmed to perform the respective steps belonging to the corresponding method and stored in a computer-readable storage medium. The storage medium includes any type of storage medium that stores programs and data so that a computer system reads the programs and the data. Further, the storage medium may be distributed among computer systems connected to each other through a communication network and computer-readable codes may be stored and executed in a decentralized manner.

Further, the functions provided among the constituting elements of FIGS. 6 to 9 may be implemented by further subdivided constituting elements, or a plurality of constituting elements may be combined to perform a specific function. Moreover, these constituting elements may be implemented to run one or more computers in a system.

The explanation as set forth above is merely described a technical idea of the exemplary embodiments of the present disclosure, and it will be understood by those skilled in the art to which this disclosure belongs that various changes and modifications is made without departing from the scope and spirit of the claimed invention as disclosed in the accompanying claims. Therefore, the exemplary embodiments disclosed herein are not used to limit the technical idea of the present disclosure, but to explain the present disclosure. The scope of the claimed invention is to be determined by not only the following claims but also their equivalents. Specific terms used in this disclosure and drawings are used for illustrative purposes and not to be considered as limitations of the present disclosure. Therefore, the scope of the claimed invention is construed as defined in the following claims and changes, modifications and equivalents that fall within the technical idea of the present disclosure are intended to be embraced by the scope of the claimed invention.

What is claimed is:

1. A distributed network system for call processing, the distributed network system comprising:
   a plurality of relay devices that perform call processing; and
   a call routing server that manages information on the plurality of relay devices and information on subscribers registered in the plurality of relay devices,
   wherein each of the plurality of relay devices comprises:
   a database that stores information on at least one subscriber registered in a corresponding relay device;
   a protocol relay unit that processes an initial session initiation protocol (SIP) signal of a call;
   a call processing unit that checks whether a sender and a recipient of the call are the at least one subscriber based on the initial SIP signal received through the protocol relay unit and provides the received initial SIP signal to the call routing server when the sender of the call is the at least one subscriber and the recipient of the call is not the at least one subscriber; and
   a packet processing unit that rearranges incoming call packets of the call according to a sequence of the call packets and adjusts a transmission speed of the rearranged call packets according to a condition of the incoming call packets.

2. The distributed network system of claim 1, wherein when both of the sender and the recipient of the call are the at least one subscriber, the call processing unit processes the call through the protocol relay unit, and when the sender of the call is not the at least one subscriber and the recipient of the call is the at least one subscriber, the call processing unit exchanges information on the call with the sender of the call.

3. The distributed network system of claim 2, further comprising an IP update server, wherein the call routing server, in response to a TCP channel connection request from a third relay device located in a private network among the plurality of relay devices, provides, to the IP update server, information on at least one fourth relay device, which is located in a public network and is available as a gateway for the third relay device among the plurality of relay devices managed by the call routing server;

the IP update server causes a domain name server to replace an IP address of a domain to which the third relay device is connected with an IP address of the at least one fourth relay device and notifies the call routing server that the replacement has been approved when the domain name server approves the replacement; and the call routing server provides information on the at least one fourth relay device to the third relay device to form a TCP channel between the third relay device and the fourth relay device.

4. The distributed network system of claim 3, wherein the at least one fourth relay device relays received data to the third relay device through the TCP channel and provides data received through the TCP channel from the third relay device to a user.

5. The distributed network system of claim 3, wherein the packet processing unit of the fourth relay device processes call packets of a call in which the at least one subscriber registered in the third relay device is a sender or a recipient.

6. The distributed network system of claim 1, further comprising a number authentication server that receives a service registration request of a user who wants to use a service for processing the call that is transmitted from a first relay device among the plurality of relay devices through the call routing server, provides a unique number assigned by a telecommunication company to the first relay device through the call routing server, and provides, when the number authentication server receives a call, which is transmitted via the unique number from the first relay device, from the telecommunication company, a message informing that the call number of the call transmitted via the unique number is an authentication number to the first relay device through the call routing server.

7. The distributed network system of claim 6, wherein the call routing server stores the authentication number as information on a subscriber to the first relay device, and
the first relay device stores the authentication number as information on the at least one subscriber.

8. The distributed network system of claim 1, wherein each of the plurality of relay devices further includes a gateway that sends out the call to a telecommunication company server using a landline phone line if it is determined that the recipient of the call is not the at least one subscriber and it is determined through the call routing server that the recipient of the call is not a subscriber to a different relay device.

9. The distributed network system of claim 1, wherein the call processing unit analyzes a phone number of the recipient of the call and, when the phone number includes a separator, provides a remaining number after excluding a unique number of each of the plurality of relay devices and the separator from the phone number to a gateway to thereby send out the call to a telecommunication company server using a landline phone line.

10. The distributed network system of claim 1, wherein the packet processing unit transmits the rearranged call packets at a first time interval when the call packets are received sequentially, transmits the rearranged call packets at a second time interval shorter than the first time interval when the call packets are received at the same time, and, in the occurrence of a delay while the call packets are being received, rearranges packets of the call packets that are received after the delay and transmits the rearranged packets at a third time interval shorter than the first time interval.

11. The distributed network system of claim 1, wherein the call routing server includes the packet processing unit that rearranges incoming call packets of the call according to a sequence of the call packets and adjusts a transmission speed of the rearranged call packets according to the condition of the incoming call packets.

12. The distributed network system of claim 1, wherein, in response to a request from a first relay device among the plurality of relay devices, when the recipient of a call received from the first relay device is the subscriber, the call routing server transmits the call to a second relay device to which the recipient is registered among the plurality of relay devices.

13. A call processing method performed by a distributed network system for call processing, the distributed network system including:

a plurality of relay devices performing call processing;

and a call routing server managing information on the plurality of relay devices and information on subscribers registered in the plurality of relay devices, each of the plurality of relay devices including a database storing information on at least one subscriber registered in a corresponding relay device;

a protocol relay unit processing an initial SIP signal of a call;

a call processing unit processing the call based on the initial SIP signal received through the protocol relay unit; and a packet processing unit processing and transmitting received call packets of the call, the call processing method comprising:

checking, by the call processing unit of a first relay device among the plurality of relay devices, whether a sender and a recipient of the call are the at least one subscriber based on the initial SIP signal received through the protocol relay unit of the first relay device;

providing, by the call processing unit of the first relay device, the received initial SIP signal to the call routing server when the sender of the call is the at least one subscriber, and the recipient of the call is not the at least one subscriber;

based on the initial SIP signal provided from the first relay device, when the recipient of the call belongs to the subscribers, transmitting, by the call routing server, the call to a second relay device to which the recipient is registered among the plurality of relay devices; and rearranging, by the packet processing unit of the first relay device, incoming call packets of the call according to a sequence of the call packets and adjusting a transmission speed of the rearranged call packets according to a condition of the incoming call packets.

14. The call processing method of claim 13, wherein, when the call processing unit of the first relay device determines that both of the sender and the recipient of the call are the at least one subscriber, the call processing unit of the first relay device processes the call through the protocol relay unit, and when the sender of the call is not the at least one subscriber and the recipient of the call is the at least one subscriber, information on the call is exchanged with the sender of the call by the call processing unit of the first relay device.

15. The call processing method of claim 13, wherein the distributed network system further includes a number authentication server, and the call processing method further comprises:
receiving, by the number authentication server, a service registration request of a user who wants to use a service for processing the call that is transmitted from the first relay device through the call routing server;
providing, by the number authentication server, a unique number assigned by a telecommunication company to the first relay device through the call routing server; and
when the number authentication server receives a call, which is transmitted via the unique number from the first relay device, from the telecommunication company, providing, by the number authentication server, a message informing that the call number of the call transmitted via the unique number is an authentication number to the first relay device through the call routing server.

16. The call processing method of claim 15, further comprising:
storing, by the call routing server, the authentication number as information on a subscriber to the first relay device, and
storing, by the first relay device, the authentication number as information on the at least one subscriber.

17. The call processing method of claim 13, wherein the distributed network system further includes an IP update server, and the call processing method further comprises:
providing, by the call routing server in response to a TCP channel connection request from a third relay device located in a private network among the plurality of relay devices, the IP update server with information on at least one fourth relay device, which is located in a public network and is available as a gateway for the third relay device among the plurality of relay devices managed by the call routing server;
causing, by the IP update server, a domain name server to replace an IP address of a domain to which the third relay device is connected with an IP address of the at least one fourth relay device and notifying the call routing server that the replacement has been approved when the domain name server approves the replacement; and
providing, by the call routing server, information on the at least one fourth relay device to the third relay device to form a TCP channel between the third relay device and the fourth relay devices.

18. The call processing method of claim 13, wherein the adjusting of the transmission speed includes transmitting the rearranged call packets at a first time interval when the call packets are received sequentially, transmitting the rearranged call packets at a second time interval shorter than the first time interval when the call packets are received at the same time, and, in the occurrence of a delay while the call packets are being received, rearranging packets of the call packets that are received after the delay and transmitting the rearranged packets at a third time interval shorter than the first time interval.

19. A non-transitory storage medium that stores a program executing a call processing method performed by a distributed network system for call processing, the distributed network system including:
a plurality of relay devices performing call processing; and
a call routing server managing information on the plurality of relay devices and information on subscribers registered in the plurality of relay devices, each of the plurality of relay devices including a database storing information on at least one subscriber registered in a corresponding relay device;
a protocol relay unit processing an initial SIP signal of a call;
a call processing unit processing the call based on the initial SIP signal received through the protocol relay unit; and
a packet processing unit processing and transmitting received call packets of the call,
the call processing method comprising:
checking, by the call processing unit of a first relay device among the plurality of relay devices, whether a sender and a recipient of the call are the at least one subscriber based on the initial SIP signal received through the protocol relay unit of the first relay device;
providing, by the call processing unit of the first relay device, the received initial SIP signal to the call routing server when the sender of the call is the at least one subscriber, and the recipient of the call is not the at least one subscriber;
based on the initial SIP signal provided from the first relay device, when the recipient of the call belongs to the subscribers, transmitting, by the call routing server, the call to a second relay device to which the recipient is registered among the plurality of relay devices; and
rearranging, by the packet processing unit of the first relay device, incoming call packets of the call according to a sequence of the call packets and adjusting a transmission speed of the rearranged call packets according to a condition of the incoming call packets.

* * * * *